US008202339B2

(12) United States Patent
Janakiraman et al.

(10) Patent No.: US 8,202,339 B2
(45) Date of Patent: Jun. 19, 2012

(54) INERTIAL IMPACTOR WITH ENHANCED SEPARATION

(75) Inventors: Arun Janakiraman, Madison, WI (US); Shiming Feng, Fitchburg, WI (US); Peter K. Herman, Stoughton, WI (US)

(73) Assignee: Cummins Filtration IP Inc., Minneapolis, MN (US)

( * ) Notice: Subject to any disclaimer, the term of this patent is extended or adjusted under 35 U.S.C. 154(b) by 251 days.

(21) Appl. No.: 12/764,514

(22) Filed: Apr. 21, 2010

(65) Prior Publication Data

US 2011/0023429 A1 Feb. 3, 2011

Related U.S. Application Data

(60) Provisional application No. 61/229,573, filed on Jul. 29, 2009, provisional application No. 61/229,578, filed on Jul. 29, 2009.

(51) Int. Cl.
*B01D 45/00* (2006.01)

(52) U.S. Cl. ................. 55/434; 55/446; 55/462; 55/463

(58) Field of Classification Search .................... 55/434, 55/446, 462, 463
See application file for complete search history.

(56) References Cited

U.S. PATENT DOCUMENTS

| | | | |
|---|---|---|---|
| 4,014,671 | A | 3/1977 | Andro et al. |
| 5,564,401 | A | 10/1996 | Dickson |
| 6,290,738 | B1 | 9/2001 | Holm |
| 6,521,010 | B1 | 2/2003 | Katata |
| 6,576,045 | B2 | 6/2003 | Liu et al. |
| 7,238,216 | B2 | 7/2007 | Malgorn et al. |
| 7,473,291 | B2 | 1/2009 | Evenstad et al. |
| 7,648,543 | B2 | 1/2010 | Faber et al. |
| 7,655,073 | B2 | 2/2010 | Evenstad et al. |
| 2008/0257147 | A1 | 10/2008 | Gregory |
| 2009/0100811 | A1 | 4/2009 | Scheckel et al. |
| 2009/0120854 | A1 | 5/2009 | Parikh et al. |
| 2009/0193770 | A1 | 8/2009 | Holzmann et al. |
| 2010/0024366 | A1 | 2/2010 | Hodges et al. |
| 2010/0101425 | A1 | 4/2010 | Herman et al. |

FOREIGN PATENT DOCUMENTS

WO 2009/086605 7/2009

*Primary Examiner* — Jason M Greene
*Assistant Examiner* — Dung H Bui
(74) *Attorney, Agent, or Firm* — Andrus, Sceales, Starke & Sawall, LLP

(57) ABSTRACT

An inertial gas-liquid impactor separator includes an inertial impactor collector having an impactor surface extending diagonally relative to axially accelerated flow, which surface is preferably a cone having a leading tip axially facing and axially aligned with the acceleration nozzle. In a further aspect, first and second inertial impactor collectors are provided in series, with an orifice in the first inertial impactor collector providing a nozzle for the second inertial impactor collector. Improved performance is provided by reducing the extent of the stagnation region to change from a narrow band particle size range to a wider band range and to shift cut-off size. An inertial gas-liquid impactor separator has a perforated layer of coalescence media having at least one aperture through which the gas-liquid stream flows. Improved performance is provided by increased penetration of the flow into the media patch and thereby enhancing particle capture by interception, impaction and diffusion.

50 Claims, 23 Drawing Sheets

*Conical Impactor*

CURRENT (PRIOR ART) PERFORMANCE VERSUS DESIRED

*Conical Impactor*

*Flow pathlines for a conical impactor*

Comparison of static pressure contours between flat plate and conical impactor

Extent of the stagnation region is much smaller in a conical impactor than an equivalent flat plate impactor. Helps

*Relative Collection efficiency comparison between flat plate and conical impactors. Effect of media not included in the model. (Diesel liquid droplets -730 kd/m 3 density)*

*Flow pathlines illustrating particle capture mechanisms*

*Relative Collection efficiencies.*
*(Effect of media not included in the model).*

Virtual Flat Plate Impactor

*Flow pathlines for a Virtual flat plate impactor*

Virtual Flat Plate Impactor

*Virtual Conical Impactor*

*Flow pathlines for virtual conical impactor*

Collection Efficiency Curve for a Virtual Conical Impactor

*Perforated-media Impactor*

Flow pathlines for flat-plate and perforated-media impactors at 4.5 SCFM

Flow pathlines for flat-plate and perforated-media impactors at 6.75 SCFM

Flow pathlines for flat-plate and perforated-media impactors at 10.7 SCFM

Flow pathlines for flat-plate and perforated-media impactors at 11.6 SCFM

CFD comparison of flow penetration through porous impaction media layer

*Comparison of restriction across "Soupcan"*

*Ultra-fine oil mist distribution used in experimental work*

Comparison of gravimetric efficiency for "Soupcan"

INERTIAL IMPACTOR WITH ENHANCED SEPARATION

CROSS-REFERENCE TO RELATED APPLICATIONS

This application claims the benefit of and priority from provisional U.S. Patent Application No. 61/229,573, filed Jul. 29, 2009, and provisional U.S. Patent Application No. 61/229,578, filed Jul. 29, 2009, both incorporated herein by reference.

BACKGROUND AND SUMMARY

The invention relates to inertial impactor separators.

Inertial impactor separators are known in the prior art, including inertial gas-liquid impactor separators for removing and coalescing liquid particles from a gas-liquid stream, including in engine crankcase ventilation separation applications, including closed crankcase ventilation (CCV) and open crankcase ventilation (OCV). In inertial gas-liquid separators, liquid particles are removed from a gas-liquid stream by accelerating the stream or aerosol to high velocities through nozzles or orifices and directing same against an impactor, typically causing a sharp directional change, effecting the noted liquid separation. Coalescing separators are also known in the prior art, wherein liquid particles are removed from the gas-liquid stream by coalescence. The noted separators, including inertial impactors and coalescers, have various uses, including in oil separation applications for blowby gases from the crankcase of an internal combustion engine.

The present invention arose during continuing development efforts in the above technology.

BRIEF DESCRIPTION OF THE DRAWINGS

FIG. 1 shows current (prior art) performance vs. desired.

FIG. 2 shows a conical impactor.

FIG. 3 shows flow pathlines for a conical impactor.

FIG. 4 shows a comparison of static pressure contours between flat plate and conical impactor.

FIG. 5 shows a relative collection efficiency comparison between flat plate and conical impactors (effect of media not included in the model) diesel liquid droplets −730 kg/m^3 density.

FIG. 6 shows a crater type conical impactor.

FIG. 7 shows flow pathlines illustrating particle capture mechanisms.

FIG. 8 shows relative collection efficiencies (effect of media not included in the model).

FIG. 9 shows a virtual flat plate impactor.

FIG. 10 shows flow pathlines for a virtual flat plate impactor.

FIG. 11 shows a virtual flat plate impactor.

FIG. 12 shows a virtual conical impactor.

FIG. 13 shows flow pathlines for virtual conical impactor.

FIG. 14 shows a collection efficiency curve for a virtual conical impactor.

FIGS. 1, 8-11 of the '578 application correspond to FIGS. 1-5 above, respectively.

FIG. 15 shows a perforated-media impactor.

FIG. 16 shows flow pathlines for flat-plate and perforated-media impactors at 4.5 SCFM.

FIG. 17 shows flow pathlines for flat-plate and perforated-media impactors at 6.75 SCFM.

FIG. 18 shows pathlines for flat-plate and perforated-media impactors at 10.7 SCFM.

FIG. 19 shows flow pathlines for flat-plate and perforated-media impactors at 11.6 SCFM.

FIG. 20 shows CFD comparison of flow penetration through porous impaction media layer.

FIG. 21 is a comparison of restriction across "Soupcan".

FIG. 22 is graph showing ultra-fine oil mist distribution used in experimental work.

FIG. 23 is a comparison of gravimetric efficiency for "Soupcan".

DETAILED DESCRIPTION

Provisional U.S. Patent Application No. 61/229,573

The following description is from provisional U.S. Patent Application No. 61/229,573.

Conical and virtual impactors have been proposed as inertial gas-liquid separators in the current disclosure. The conical impactor consists of the nozzles for accelerating the flow and an impactor plate which is conical in shape rather than flat. The virtual impactor consists of two stages, the first stage being just a simple nozzle and an impactor plate. The impactor plate has a hole (smaller than the primary nozzle hole) having the same center as the nozzle which forms the 2nd stage. The proposed designs are claimed to have 1) smaller D50 cutsize 2) slightly flatter efficiency curve than a regular flat plate impactor (without the media) at comparable pressure expense.

Traditional flat plate impactors have a very sharp collection efficiency curve. This type for response is very good for particle size classification (ex. Cascade impactors) but not desired when the primary aim is filtration. A flat collection efficiency curve would be ideal for filtration purposes but impossible to achieve with any inertial separator. A design which can reduce the D50 cutsize and slightly flatten the efficiency curve at the same pressure expense is greatly desired.

Conical Impactor—Single Cone

Figure 1:
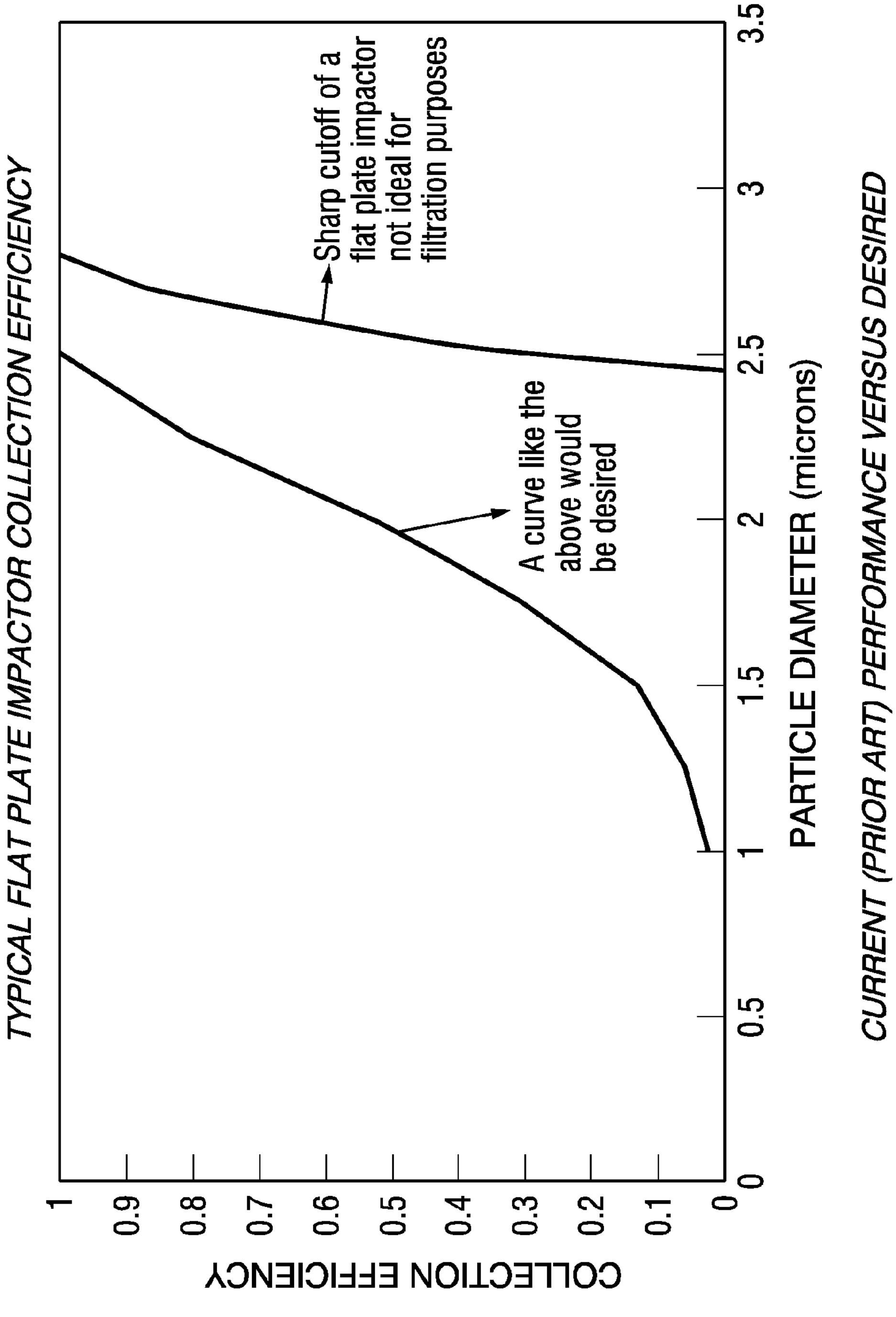
FIGS. 1-14 are from provisional U.S. Patent Application No. 61/229,573.
Figure 2:
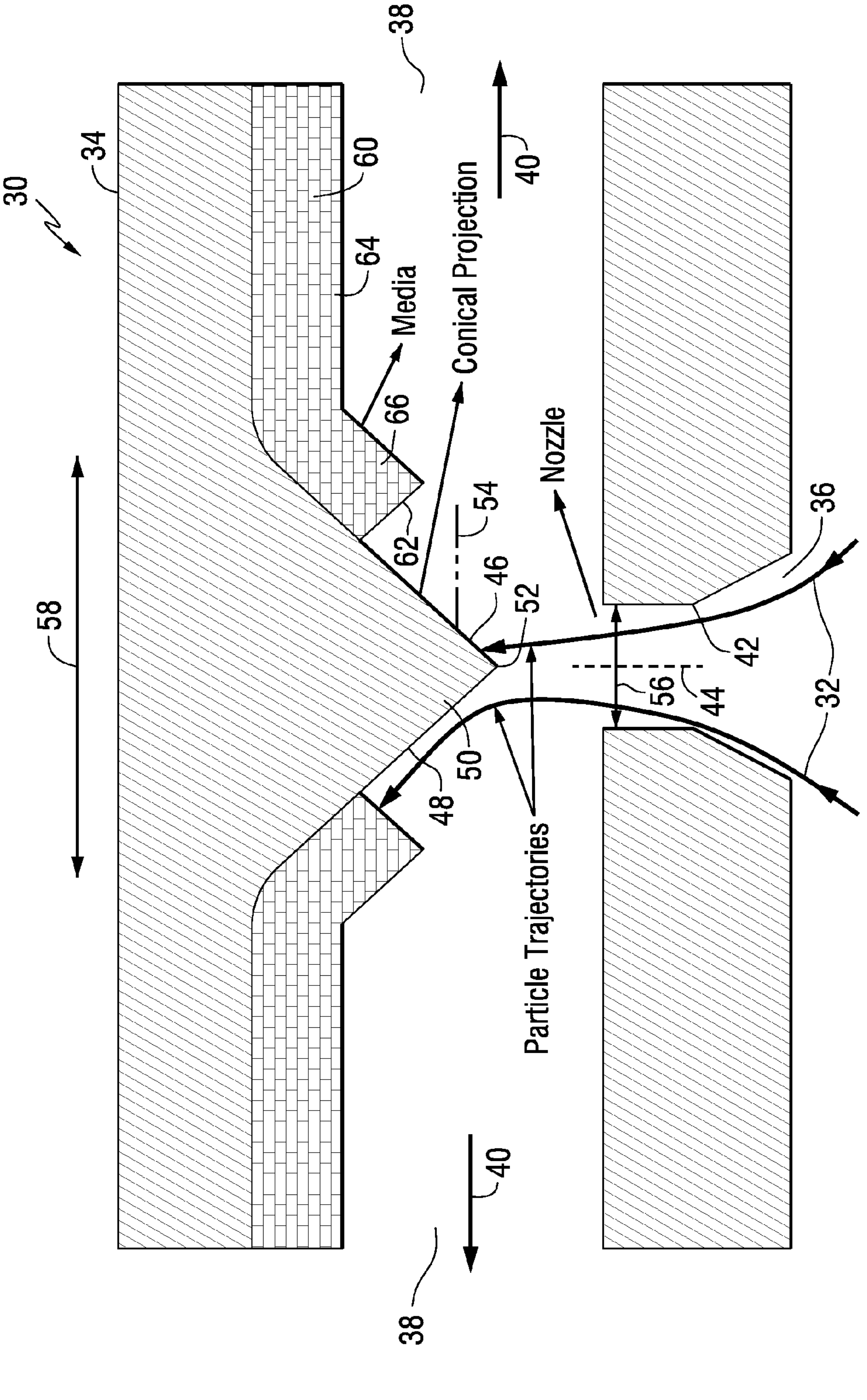
Figure 3:
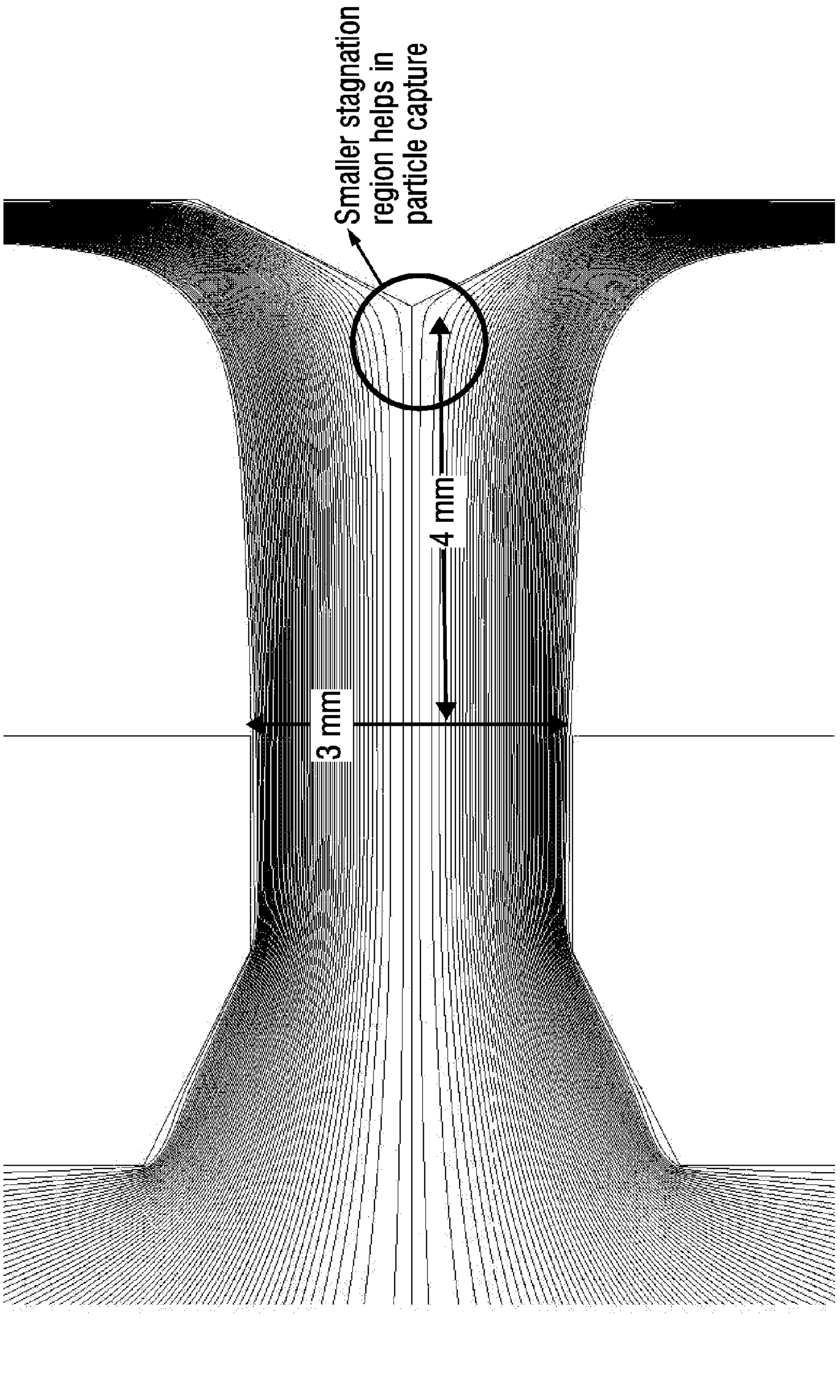
Figure 4:
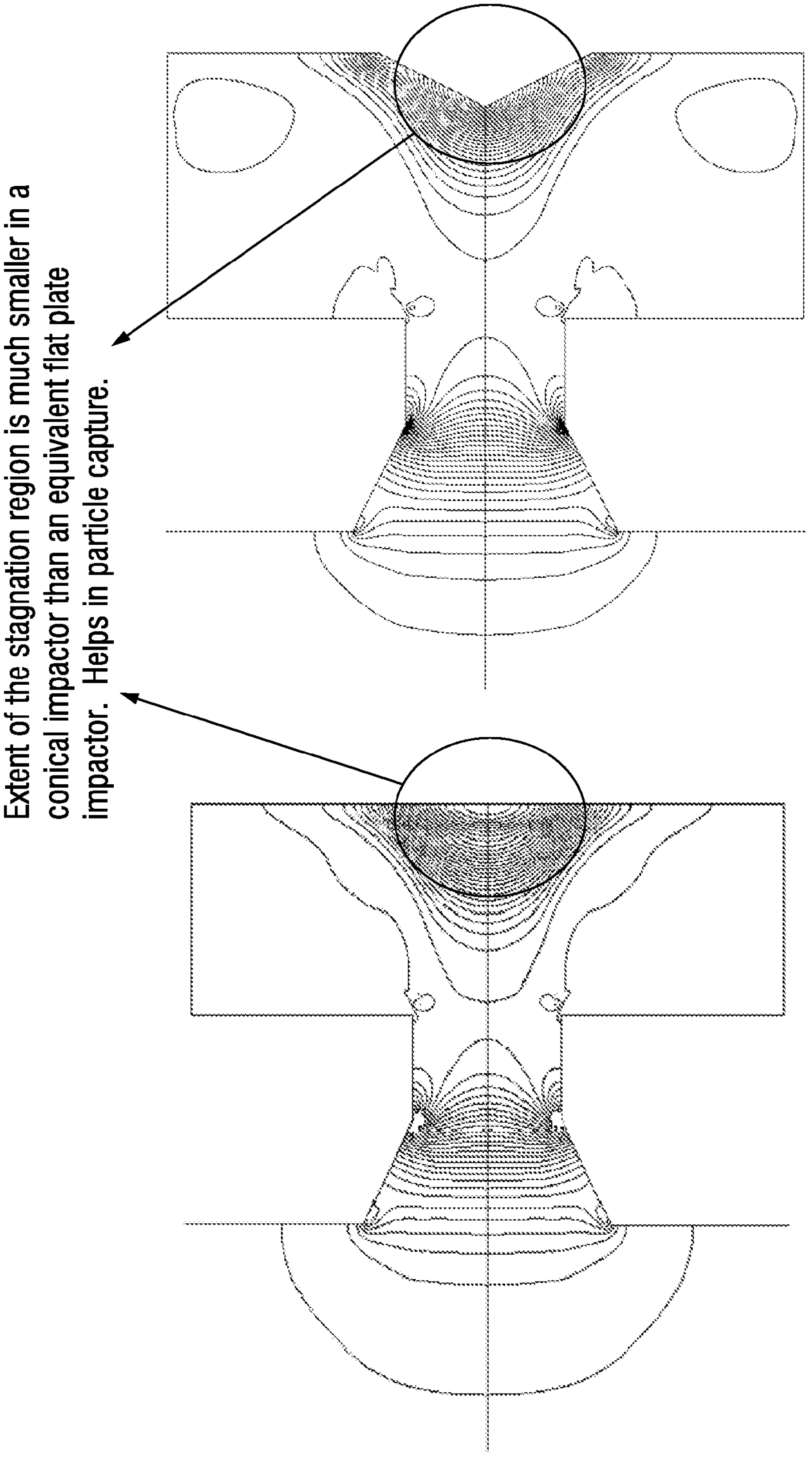
Figure 5:
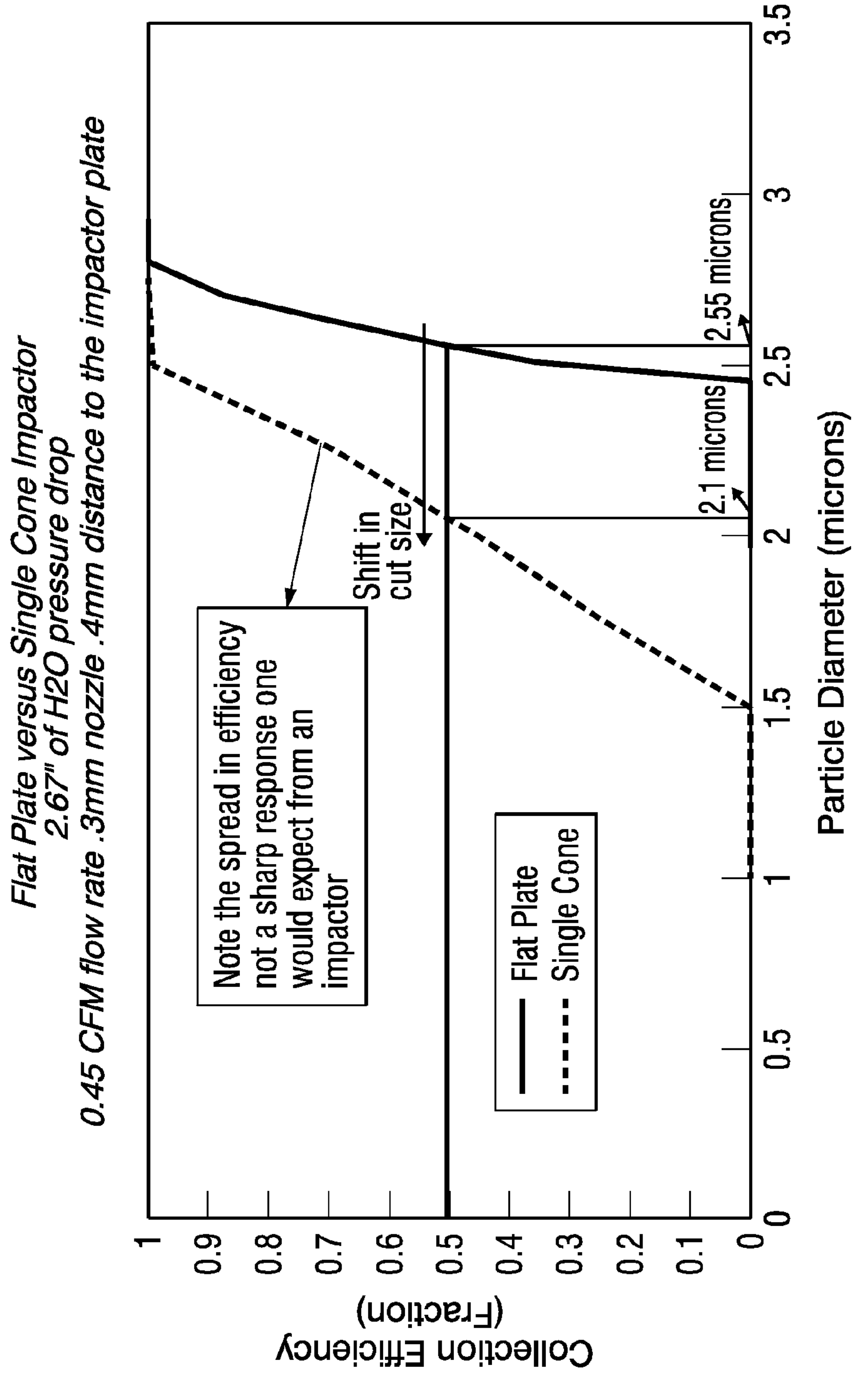

The conical impactor is very similar to a conventional impactor except for the design of the impactor plate. The impactor plate is conical in shape instead of flat. The proposed design for a simple conical impactor is shown in FIG. 2. It consists of a conical projection which occupies the same center as that of the nozzle and can be comparable in size or bigger than the nozzle. The media can be attached as shown in FIG. 2 over the projection so that interception is still a significant droplet capture mechanism. As already known the media acts as a coalescence filter. To evaluate the relative performance of a conical impactor a simple model was run in Fluent. The nozzle size chosen was 3 mm and distance to the impactor plate is around 4 mm. FIG. 3 shows the flow pathlines for the single cone configuration, FIG. 4 the static pressure contours. One thing which is obvious from these figures is the size of the stagnation region near the location where the flow hits the impactor plate. Its small and confined very close to the cone's tip, while the flat plate shows a bigger region. The smaller particles which follow the pathlines are expected to come very close to the wall because of this effect. The chances they will get captured are higher than in a flat plate impactor. FIG. 5 shows the relative comparison of collection efficiency between the conical impactor and equivalent flat plate impactor (same pressure drop across each configurations). The D50 cut point shifts to the left and curve is slightly flatter. The effect of media was not included in the model as it's not completely understood but any improvement in cut size observed in the flat plate with media case is also expected to translate to the conical impactor.

Single Cone with a Conical Crater

Figure 6:
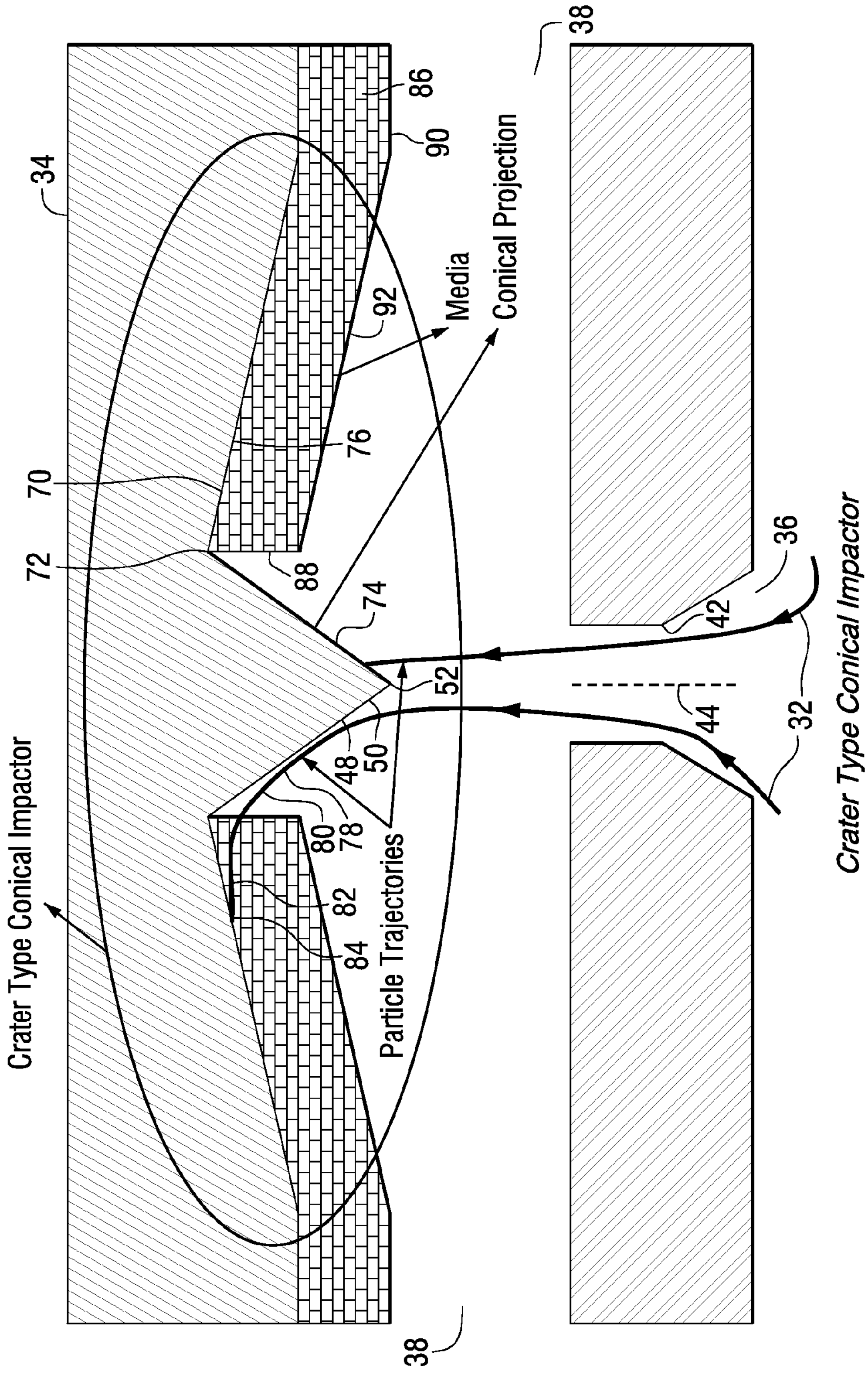

The D50 cutsize can be further reduced by introducing a conical inundation or a crater as shown in FIG. 6.

Figure 7:
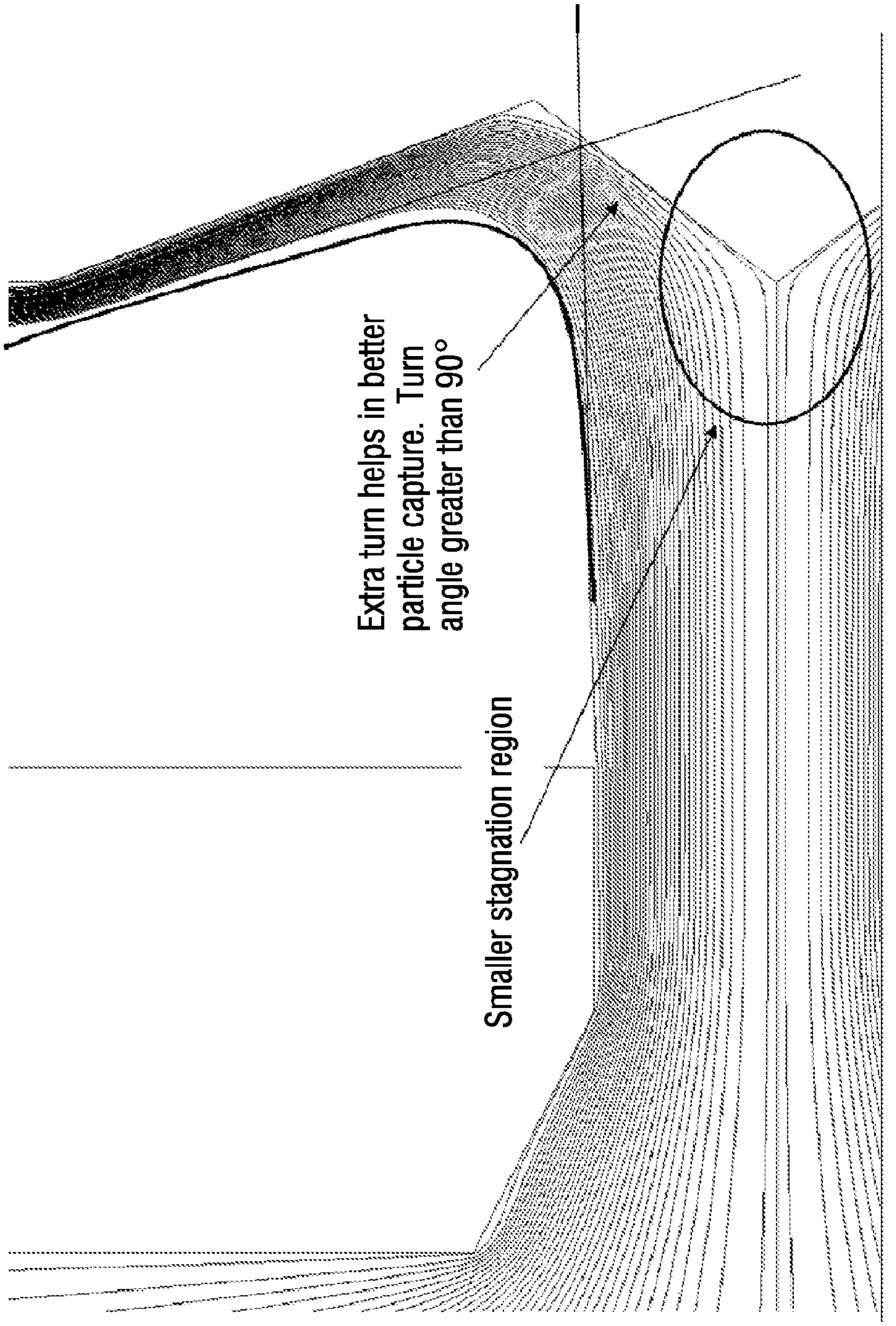
Figure 8:
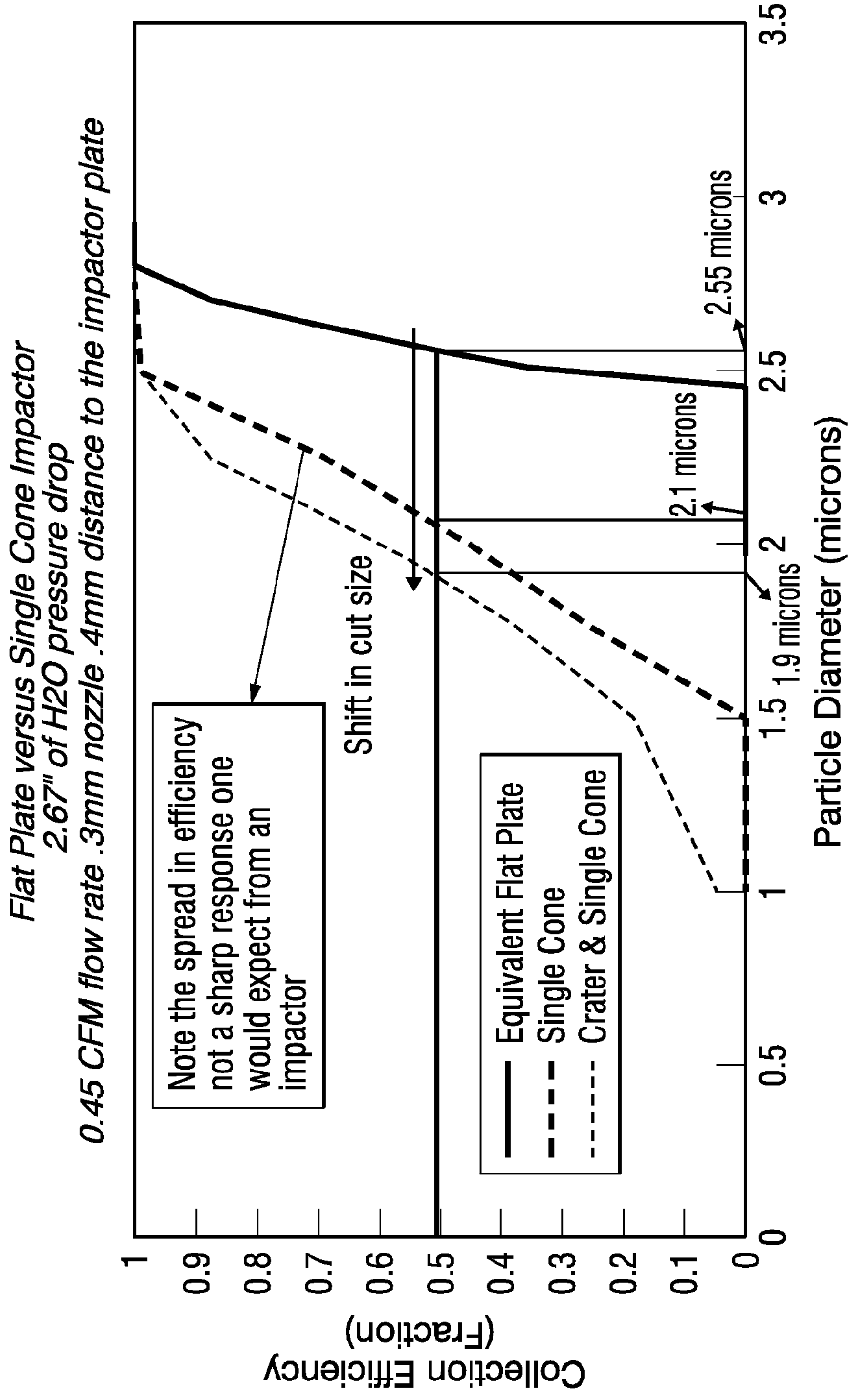

In addition to having a more confined stagnation point near the tip the flow is turned a few degrees more than a flat plate impactor and this helps in improving the cutsize and efficiency curve. FIG. 7 shows in more details this effect. Again relative performance was compared with equivalent flat plate impactor and there was significant improvement in both cutsize and efficiency curve (FIG. 8). As before the effect of media was not included in any of the simulations.

Virtual Impactor—Flat Plate

Figure 9:
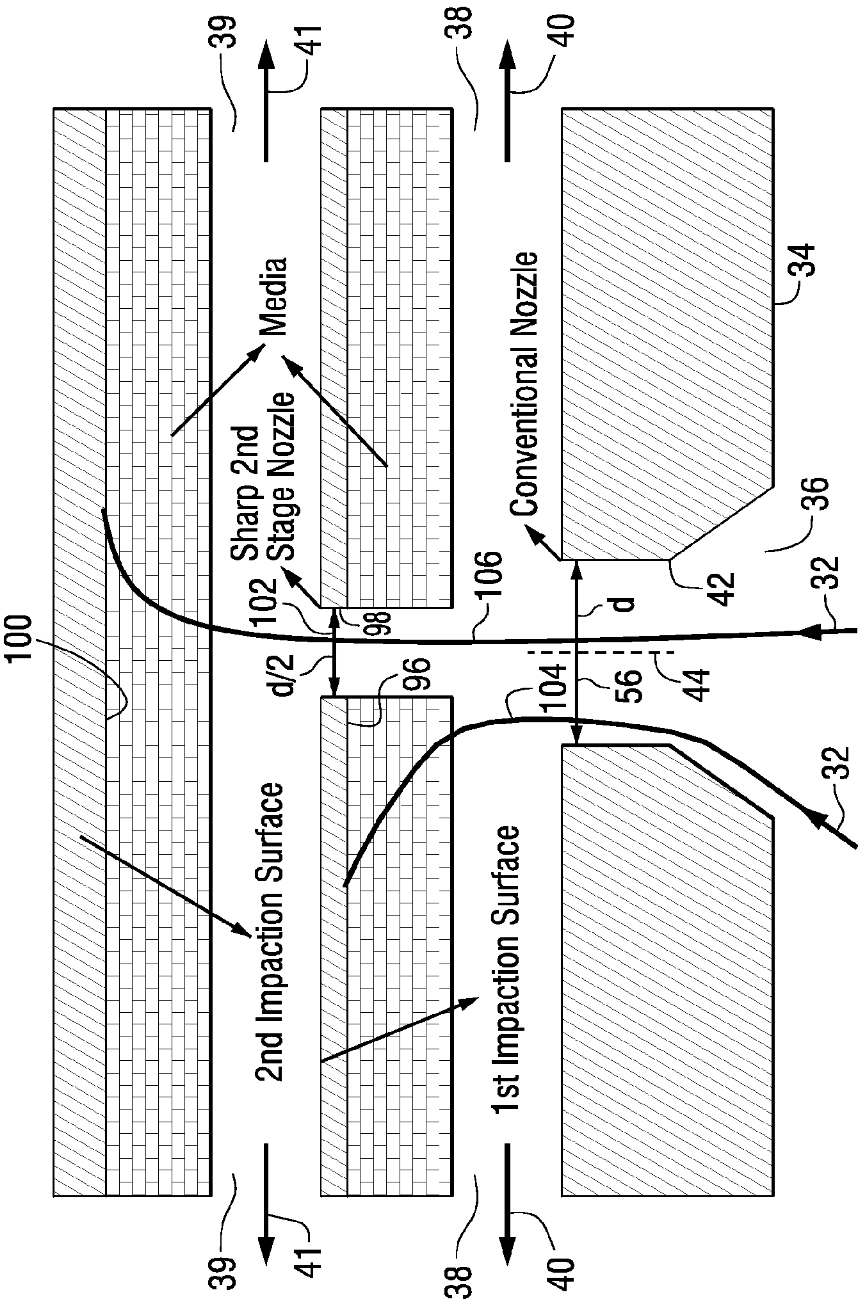
Figure 10:
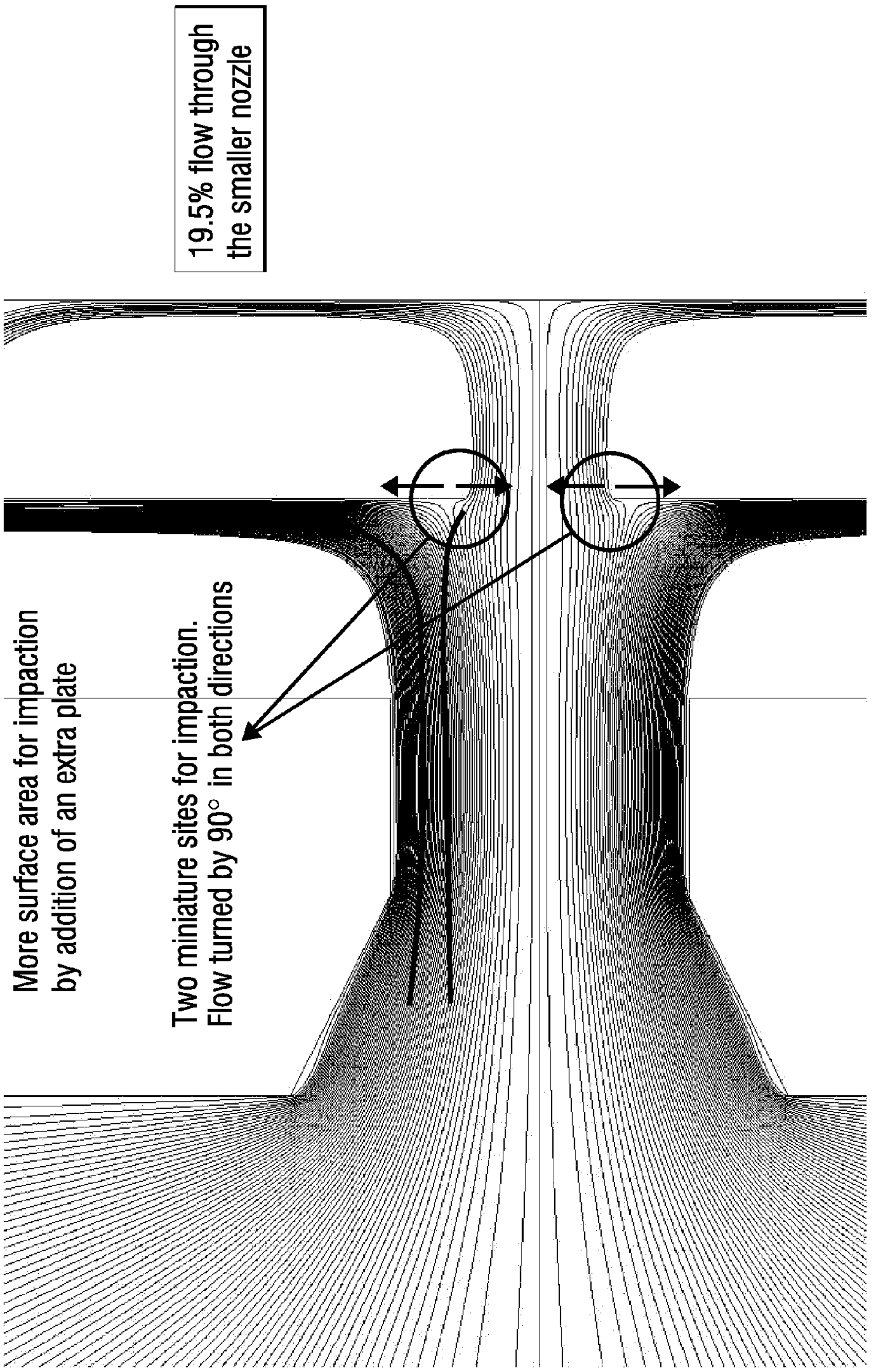

Virtual impactors are used for separating smaller particles from larger particles and are very good particle size classification device. Construction of a virtual impactor is very simple. It consists of a conventional nozzle followed very closely by a probe which occupies the same center as the nozzle and is smaller in diameter. Particles with inertia sufficient to cause them to impact an impaction plate are thrown into the collection probe. The smaller particles are carried radially away from the jet axis by the major air flow and avoid the collection probe. Thus particle classification based on size is achieved. FIG. 9 shows the virtual impactor concept. It has two nozzles having the same center placed one behind the other, the 2nd nozzle being smaller the first one (d/2 has been proposed currently, need more data on effect of 2nd nozzle diameter on cut size). FIG. 10 gives a brief explanation why the virtual impactor will perform better than an equivalent traditional impactor.

Figure 11:
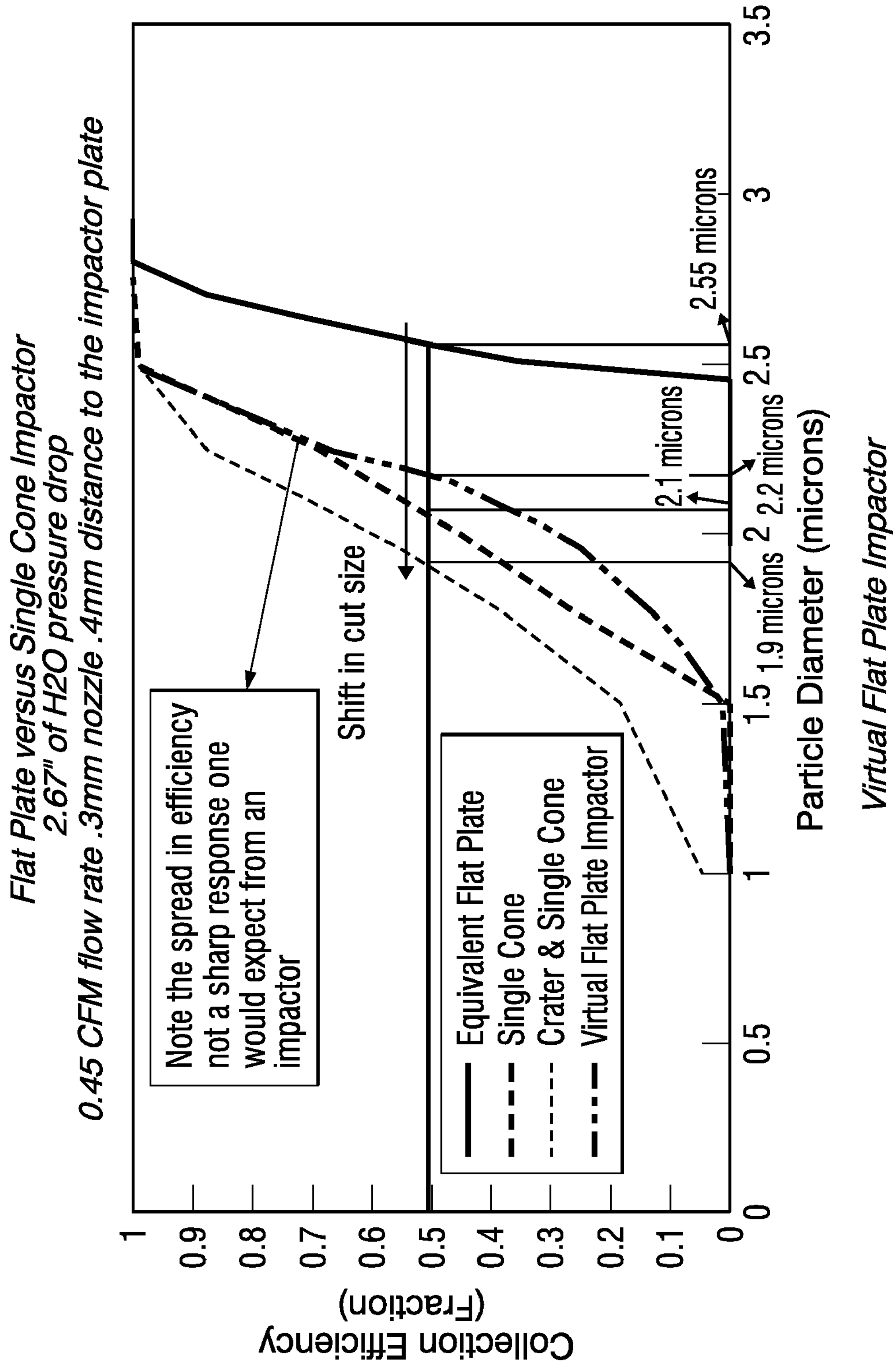

FIG. 11 shows the collection efficiency curve from CFD for the virtual impactor. As predicted from above there is a slight improvement in cutsize from an equivalent traditional impactor.

Conical Virtual Impactor

Figure 12:
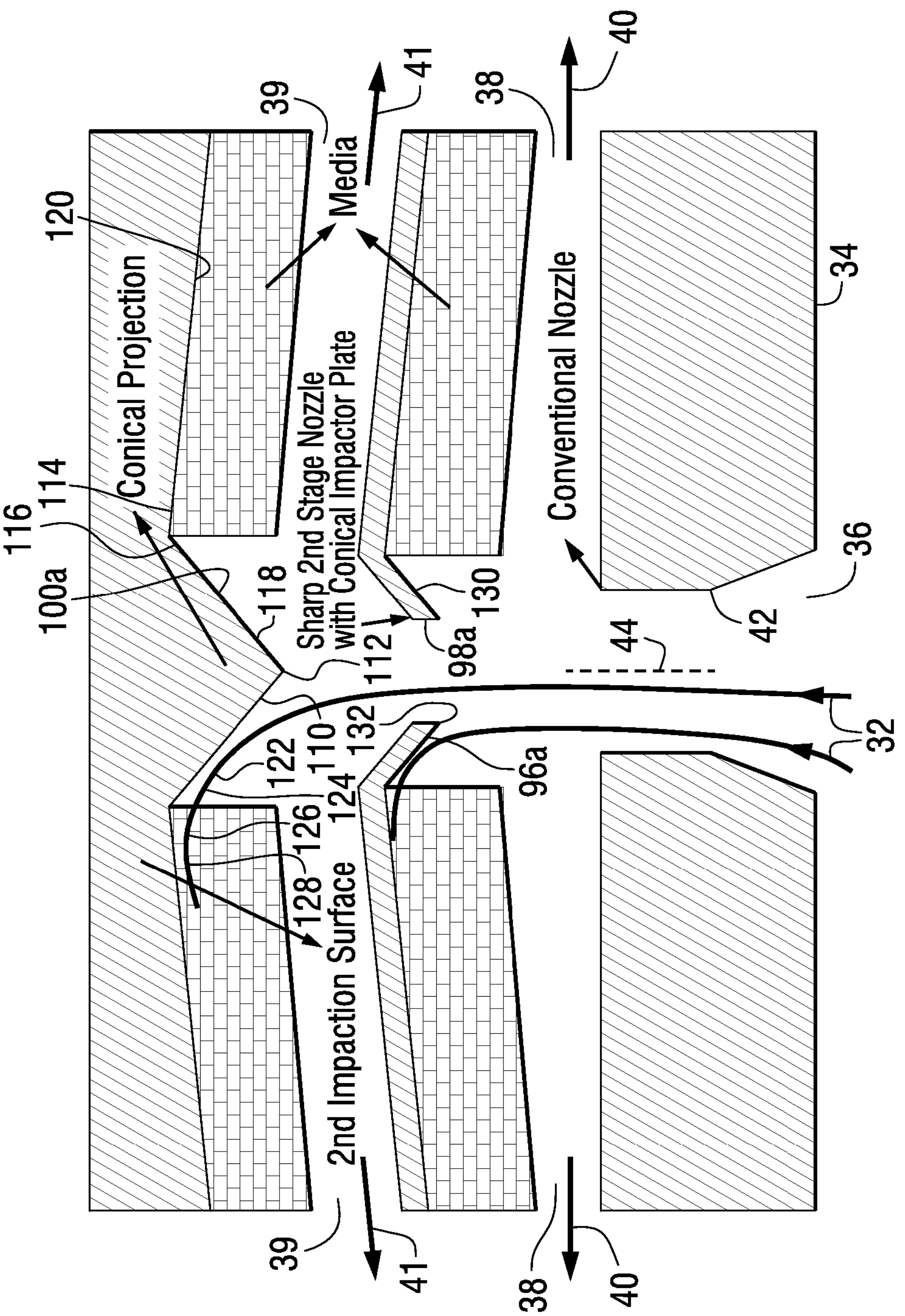
Figure 13:
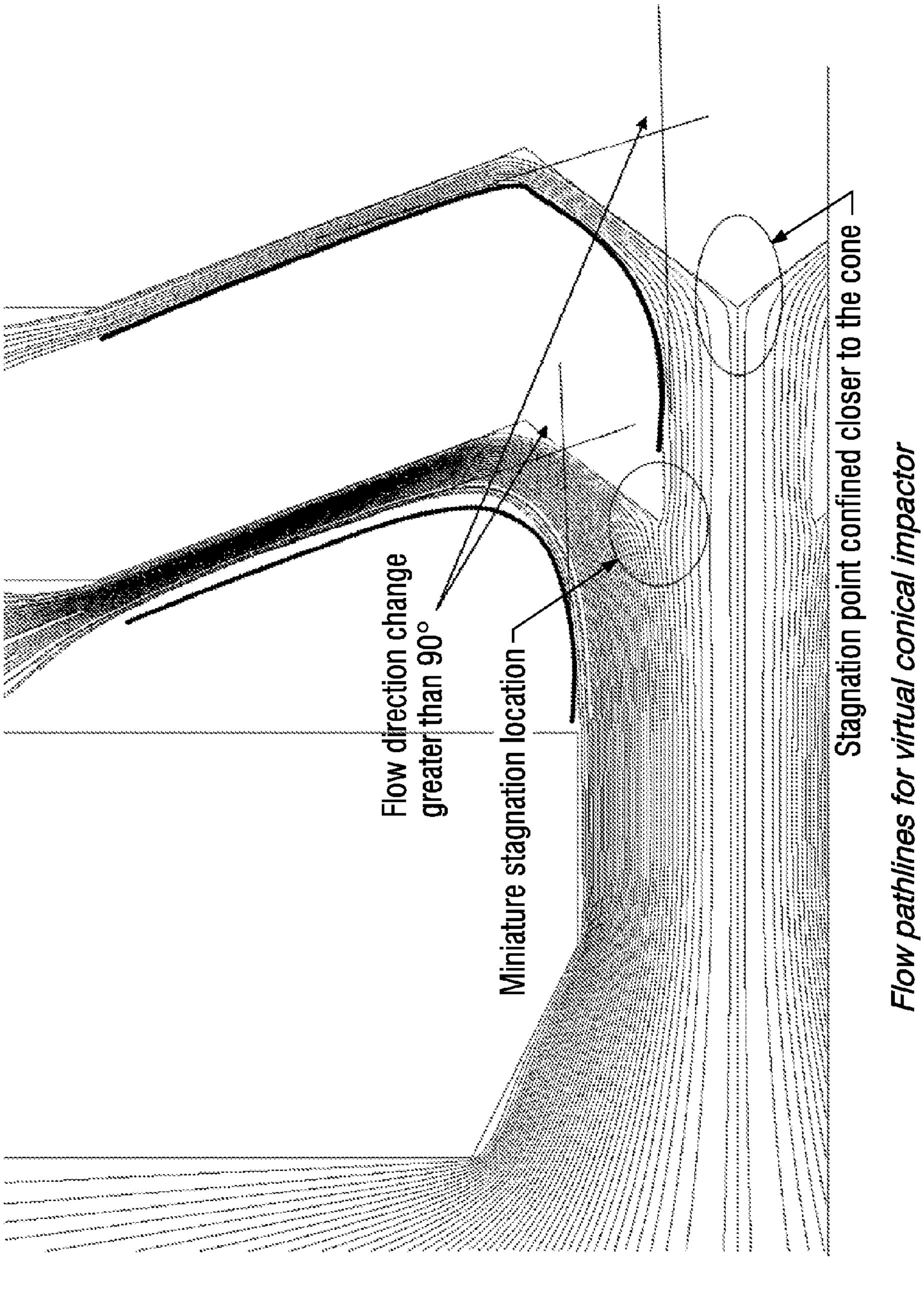
Figure 14:
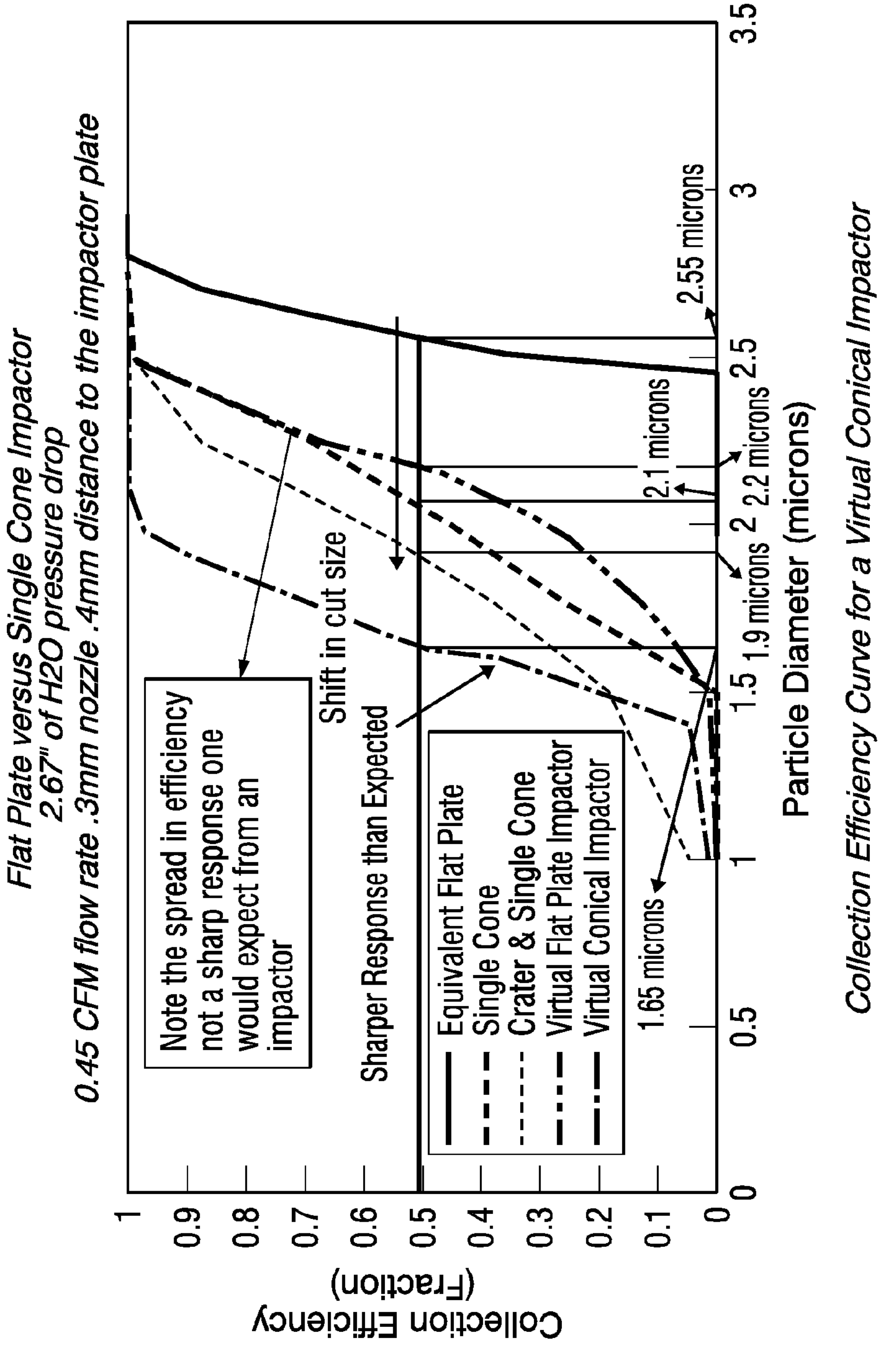

A logical extension would be to incorporate both the above two effects in a single design (conical and virtual). FIG. 12 shows this type of design. It incorporates all of the particle capture enhancing tidbits viz: a) smaller stagnation region near the tip of the conical projection b) the flow direction change of greater than 900 c) more surface area for impaction d) twin stagnation points near the first stage nozzle. Interaction of all these effects is expected to reduce the cutsize even further. FIG. 13 shows flow pathlines from the CFD simulation for such geometry (doesn't include the media) and incorporates all the phenomena. FIG. 14 shows the collection efficiency curve for the virtual conical impactor and it's sharper than expected. But this design has the best cutsize compared to others at the same pressure expense.

Other shapes of the impactor plate: pyramidal, prism.

Features: 1) shape of the impactor plate; 2) dual stage nozzles; 3) incorporation of both in one design.

Provisional U.S. Patent Application No. 61/229,578

The following description is taken from provisional U.S. Patent Application No. 61/229,578.

Impactors with conical projections on the impaction plate and/or holes punched in the porous impaction media layer have been proposed as inertial gas-liquid separators in this disclosure. The conical impactor consists of nozzles for accelerating air flow and an impactor plate with conical shapes rather than a regular flat plate. The perforated-media impactor plate has holes cut through the media layer and with centers aligning to upstream nozzle centers. The proposed designs are claimed to have 1) smaller particle D50 cutsize 2) higher particle collecting efficiency than regular flat plate impactor at comparable pressure drop.

Conventional flat plate impactors have a very sharp collection efficiency curve. This characteristic is excellent for particle size classification (e.g. Cascade impactors) but not desired for filtration purpose. A flat collection efficiency curve would be ideal for filtration purposes but impossible to achieve with any type of inertial separator. A design that can reduce the particle D50 cutsize and meanwhile slightly flatten the efficiency curve at comparable pressure drop is greatly desired.

Perforated-Media Impactor

Figure 15:
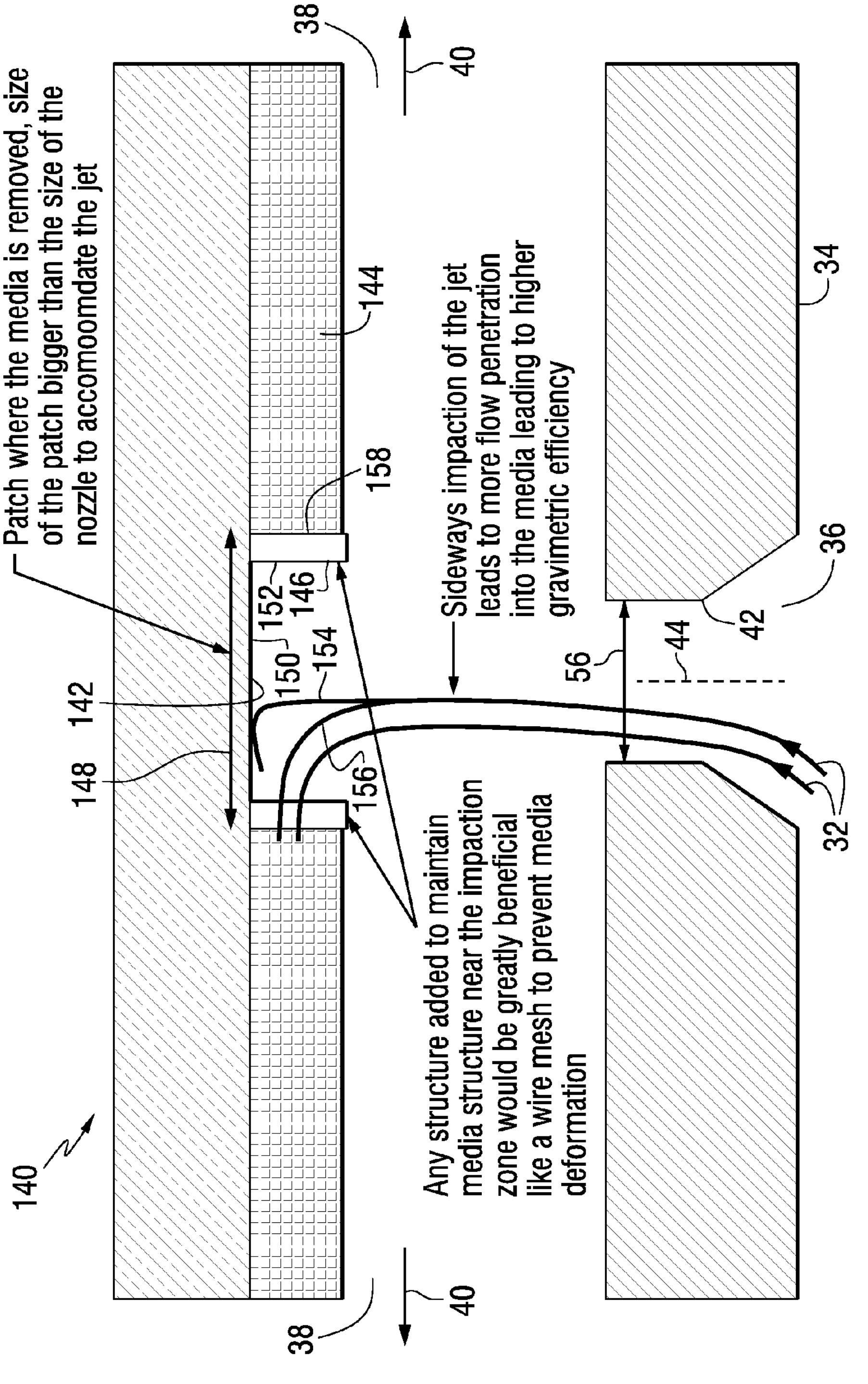
FIGS. 15-23 are from provisional U.S. Patent Application No. 61/229,578, FIGS. 2-7, 12-14, respectively.
Figure 16:
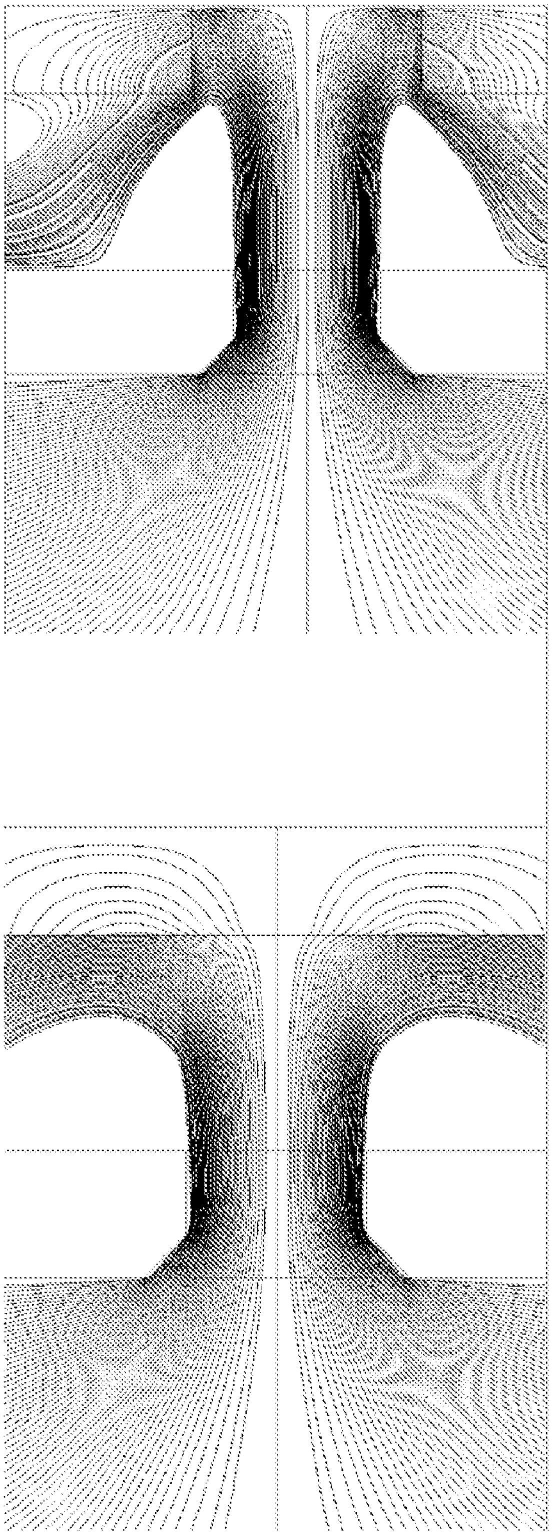
Figure 17:
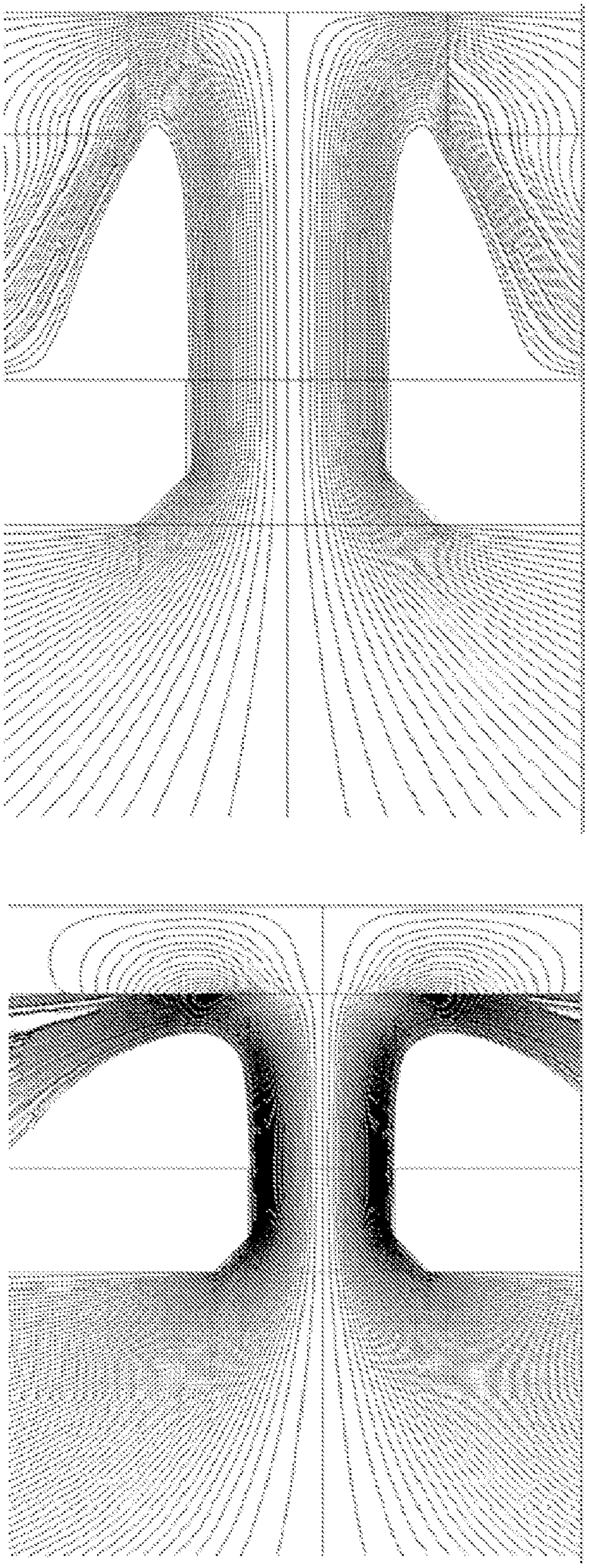
Figure 18:
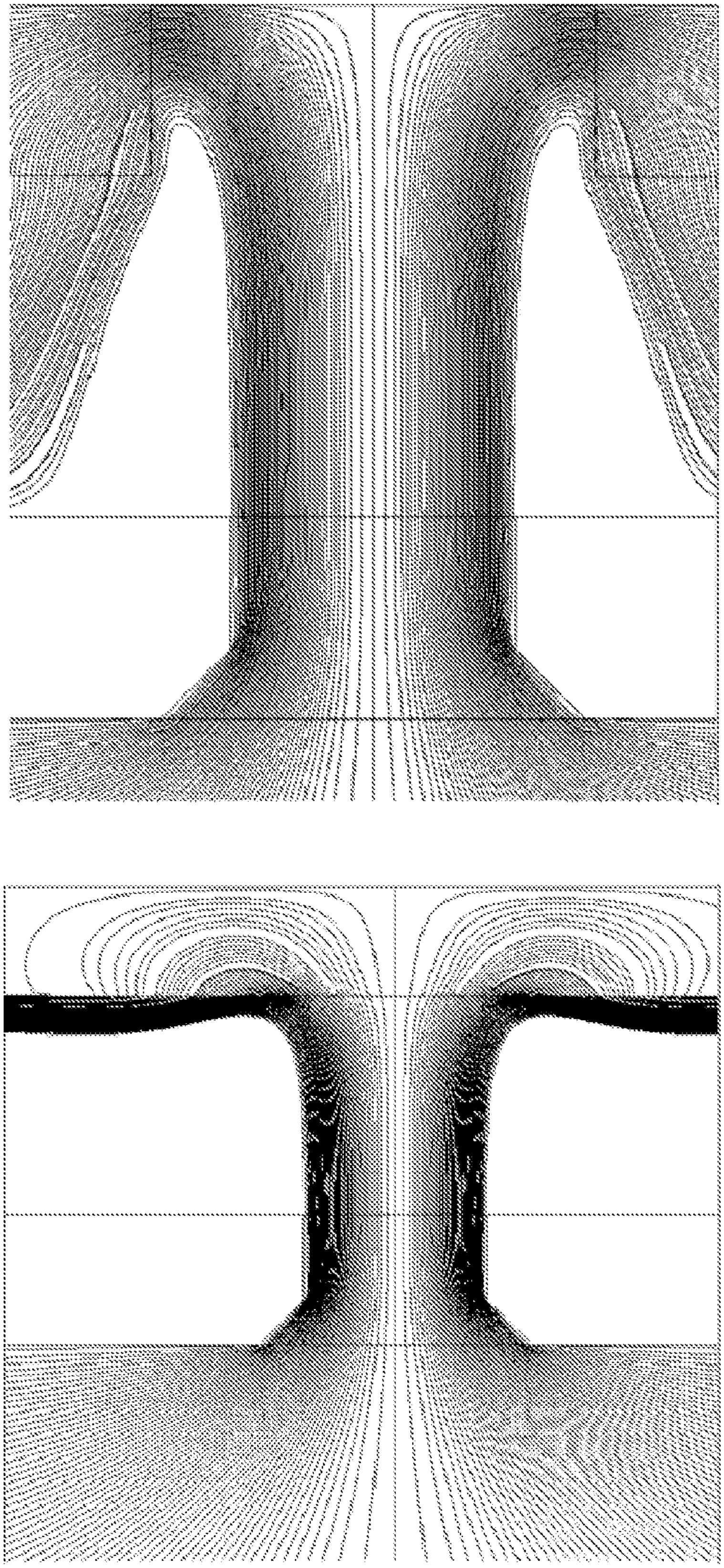
Figure 19:
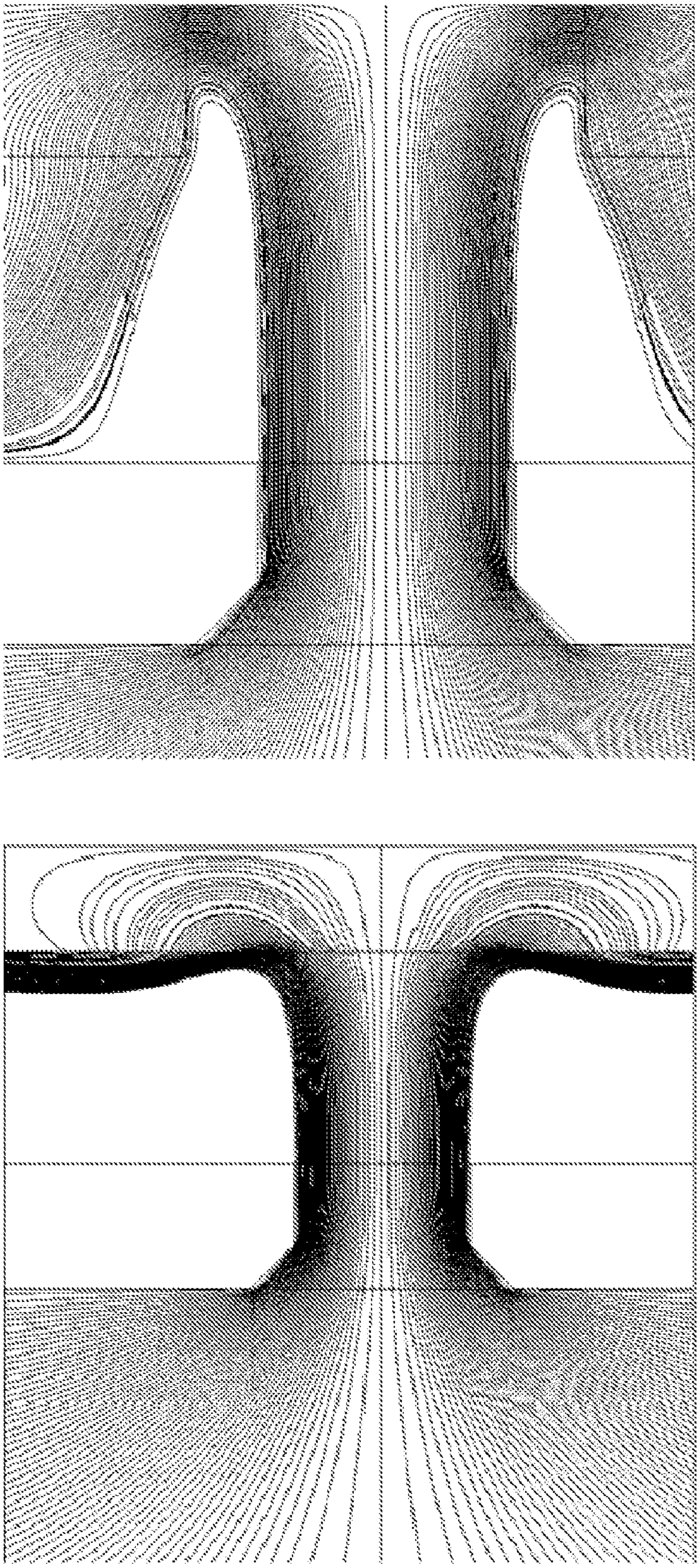
Figure 20:
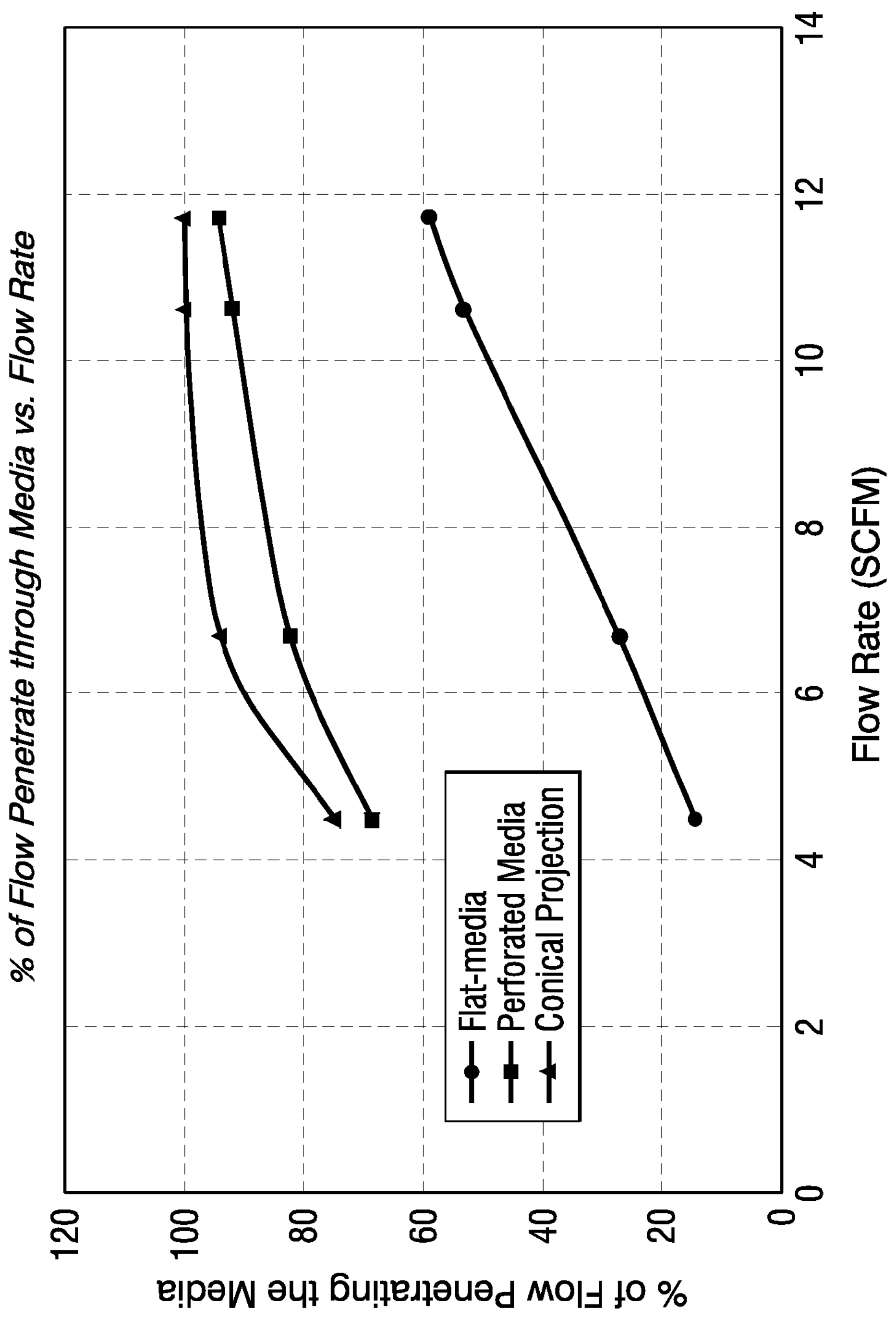

The design of the perforated-media impactor is very similar to conventional impactor, except cutting one or more holes through the media layer. The media layer acts as a coalescence filtration mechanism. The center of the holes shall align with the corresponding upstream nozzles. The proposed design for a simple perforated-media impactor is shown in FIG. 15. The size of the cut can be in a comparable or bigger size than the nozzle. To evaluate the performance of perforated-media impactor, a simple CFD model was run in Fluent. The nozzle size chosen was 3 mm and distance to the impactor plate is about 4 mm FIGS. 16-19 show the comparison of the flow pathlines between a single hole media configuration and a flat-plate impactor with equivalent thickness porous layer at different flow rates (4.5, 6.75, 10.7, and 11.6 SCFM). CFD result shows much higher percentage of streamlines that penetrate and pass through the porous media for some distance in the perforated-media impactor. FIG. 20 quantitatively shows the comparison of the flow penetration through the media layer for different design configurations. The figures illustrate the perforated-media impactor has better flow penetration through the media layer than conventional flat-plate impactor, which leads to better coalescing effect, and subsequently better filtration result. More specifically, the improvement of aerosol separation efficiency with increased media flow penetration is attributed to the additional efficiency mechanisms brought into play by fibrous filtration (inertial, interception, diffusion) of the flow streamlines that pass through the media.

Conical Impactor

The conical impactor design is also similar to conventional impactor except the design of the impaction plate. The impaction plate contains one or more conical shapes instead of a flat plate. The proposed design for a simple conical impactor is shown in FIG. 2. The design consists of a conical projection which aligns with the center of corresponding upstream nozzle and can be in a comparable or bigger size than the nozzle. The media can be attached to impaction plate as shown in FIG. 2 over the projection, or to the flat area of the plate only, so that interception is still a significant particle capturing mechanism. As already known that the media layer acts as a coalescence filter. To evaluate the performance of a conical impactor, a simple CFD model was run in Fluent. The nozzle size chosen was 3 mm and distance to the impactor plate is about 4 mm. FIG. 3 shows the flow pathlines for a single cone configuration; and FIG. 4 shows the static pressure contours for conventional flat-plate impactor and conical impactor. The figures illustrate that the conical impactor has a very small and confined high static pressure region around the cone tip, while a bigger region is associated to flat-plate impactor. The smaller particles which follow the pathlines are expected to come very close to the plate surface because of this effect, and the chances they will get captured are higher than a flat-plate impactor. FIG. 5 shows the relative comparison of collection efficiency between the conical impactor and comparable flat plate impactor (same pressure drop across both configurations). The D50 cut size shifts to the left and curve is slightly flatter. The effect of media was not included in the CFD model as its not completely understood. However, improvement in cut size observed in flat plate with media case is also expected to translate to conical impactor.

Other shapes of the impactor plate projections could include: 1) pyramidal, 2) prism, and 3) domed or curved variations of all of the above.

Experimental Results

Figure 21:
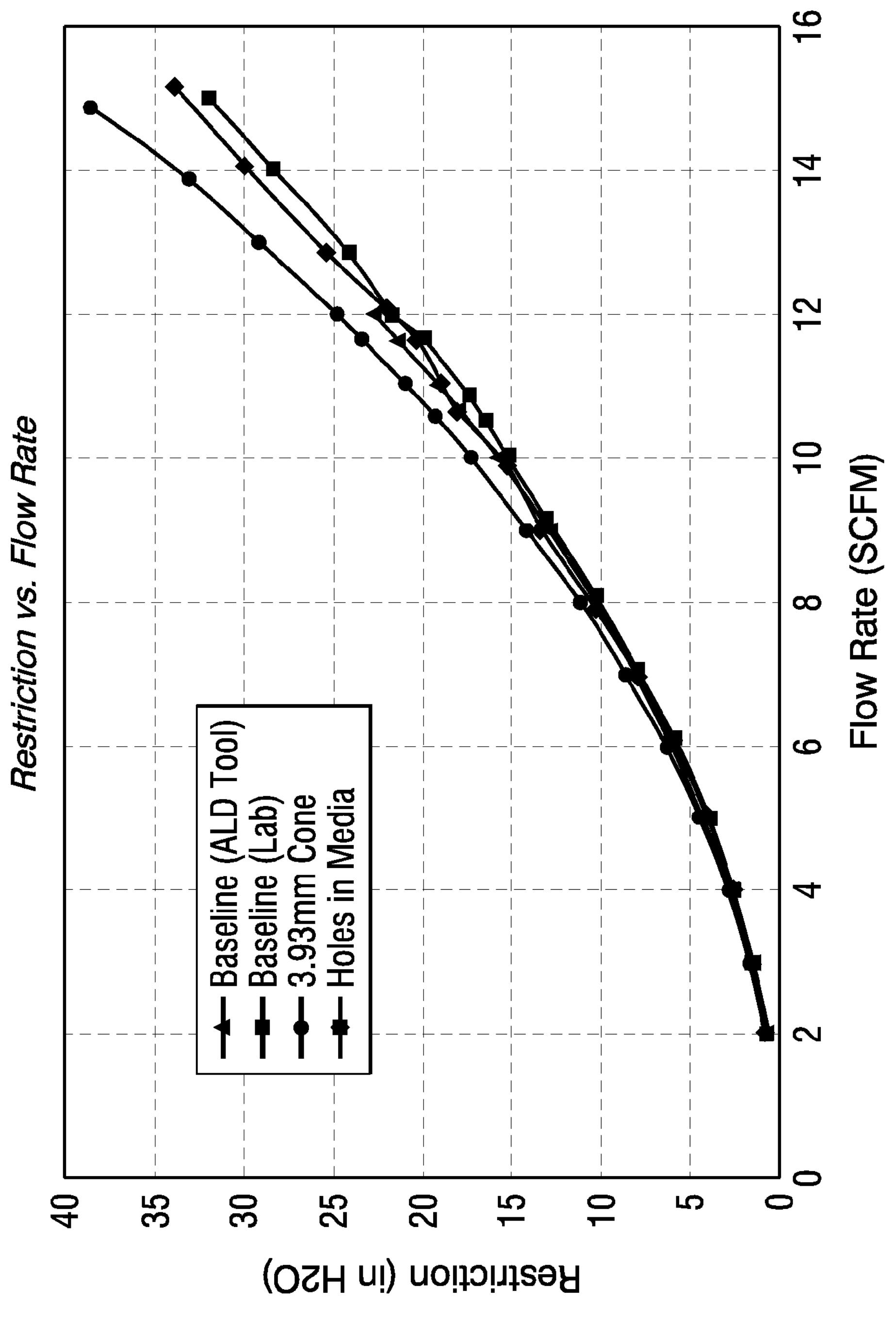
Figure 22:
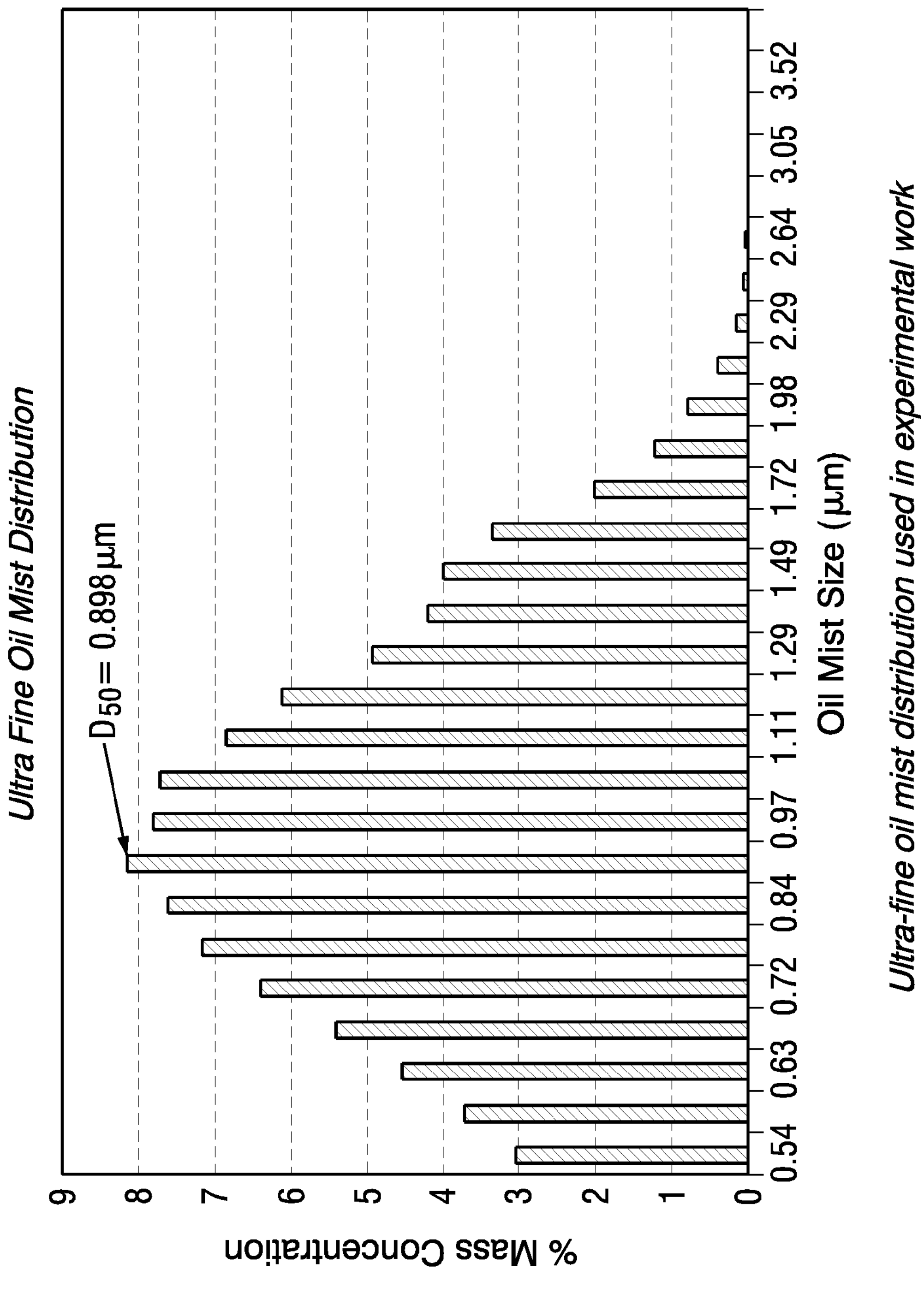
Figure 23:
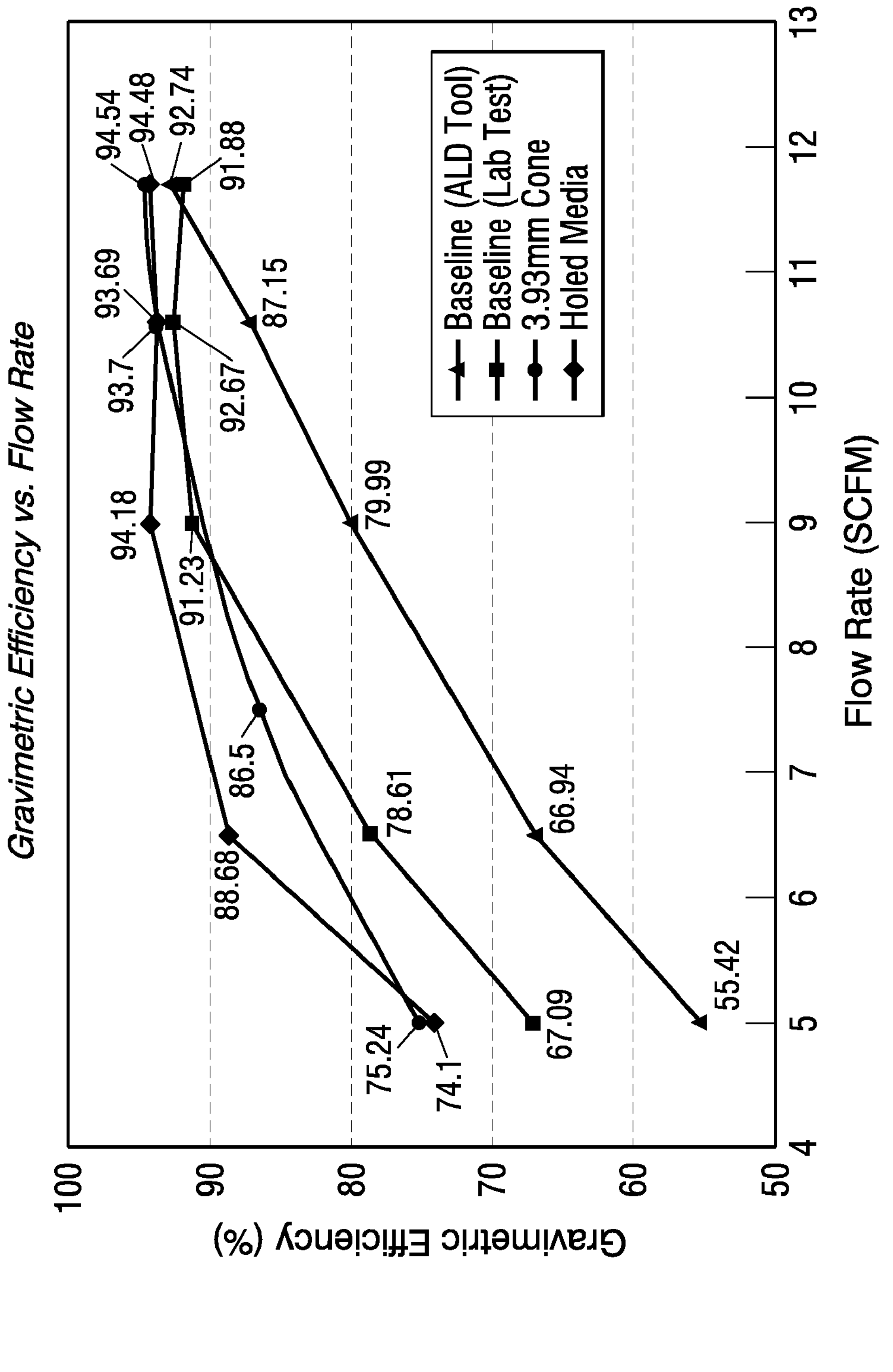

To further validate the two alternative impactor designs, a Cummins Filtration production impactor, "Soupcan" (94506A), was chosen for theoretical analysis and laboratory experimental bench work. The "Soupcan" contains five nozzles with equal diameters of 0.167" (approximately 4.24 mm). FIG. 21 essentially shows there is no pressure drop effect across the impactor with alternative designs, the minimal variation indicated in the graph is within the range of normal part-to-part variation. FIG. 22 shows the ultra-fine oil mist distribution used in experimental work and FIG. 23 indicates the gravimetric efficiency for the two alternative impactor designs along with the baseline "Soupcan". The theoretical analysis and experimental data illustrates that both perforated-media and conical impactors achieved higher filtration efficiency at comparable pressure drop caused by the alternative designs.

Features: 1) holes cut in porous impaction media material, holes being aligned with corresponding impactor nozzle jets, and allowing jet to increasingly penetrate the porous zone substrate; 2) geometry of the impactor plate (projection cones, pyramids, etc.) with OR without a porous zone impaction surface; 3) incorporation of both in one design.

Present Application

An inertial gas-liquid impactor separator 30, FIG. 2, is provided for removing liquid particles from a gas-liquid stream 32 and includes a housing 34 having an inlet 36 for receiving gas-liquid stream 32, and an outlet 38 for discharging a gas stream 40. A nozzle or orifice 42 in the housing receives the gas-liquid stream from inlet 36 and accelerates the gas-liquid stream axially along an axis 44 through nozzle 42. An inertial collector 46 in the housing is in the path of the accelerated gas-liquid stream and causes liquid particle separation from the gas-liquid stream. Inertial impactor collector 46 includes an impactor surface 48 extending diagonally relative to axis 44. In one embodiment, impactor surface 48 is provided by a cone 50 having a leading tip 52 axially facing and axially aligned with nozzle 42. In one embodiment, cone 50 has a cylindrical outer surface at 48 in transverse cross-section along a plane 54 normal to axis 44, i.e. plane 54 extends into the page in FIG. 2. In another embodiment, cone 50 has a polygonal outer surface in transverse cross-section along plane 54 normal to the axis 44. In a further embodiment, the cone is a pyramid. Nozzle 42 has an axially extending centerline (up-down in the orientation of FIG. 2), and cone 50 has an axially extending centerline (up-down in the orientation of FIG. 2), and in a preferred embodiment, such centerlines are coaxial, for example as illustrated at 44. Nozzle 42 has a width 56 transverse to axis 44. Cone 50 has a width 58 transverse to axis 44. In the preferred embodiment, width 58 of cone 50 is greater than or equal to width 56 of nozzle 42.

In a further embodiment, the inertial impactor collector includes a layer 60 of coalescence media, e.g. fibrous material, having an aperture 62 through which cone 50 extends towards nozzle 42. Coalescence media layer 60 has a first section 64 adjacent cone 50 and extending transversely of axis 44. Coalescence media layer 60 has a second section 66 extending along cone 50 along a diagonal taper relative to axis 44. Second section 66 terminates at aperture 62 through which cone 50 extends at leading tip 52.

FIG. 6 shows a further embodiment and uses like reference numerals from above where appropriate to facilitate understanding. The inertial impactor collector includes a crater 70 in which cone 50 sits at a base 72 of the cone. Cone 50 extends from tip 52 to base 72 along a first diagonal deflection surface 74 relative to axis 44. Crater 70 extends from base 72 along a second diagonal deflection surface 76 relative to axis 44. The flow through nozzle 42 impacts first diagonal deflection surface 74 and makes a first turn 78 along a first angle less than 90° to flow along a first deflection direction 80, and then impacts second diagonal deflection surface 76 and makes a second turn 82 to flow along a second deflection direction 84. The sum of first and second turns 78 and 82 is preferably greater than 90°. In one embodiment, the inertial impactor collector includes a layer 86 of coalescence media, e.g. fibrous material, having an aperture 88 through which cone 50 extends toward nozzle 42. Coalescence media layer 86 has a first section 90 adjacent crater 70, and a second section 92 extending along second diagonal deflection surface 76. Second section 92 terminates at aperture 88 through which cone 50 extends at a leading tip 52.

In FIG. 6, the inertial impactor collector includes crater 70 from which impactor surface 48 extends diagonally along first diagonal deflection surface 74 relative to axis 44, the first diagonal deflection surface 74 having the noted base 72 in crater 70. The crater extends from base 72 along the noted second diagonal deflection surface 76 relative to axis 44.

FIG. 9 shows a further embodiment and uses like reference numerals from above where appropriate to facilitate understanding. Housing 34 has an inlet 36 for receiving a gas-liquid stream 32, and one or more outlets 38, 39 for discharging a gas stream 40, 41. A first nozzle 42 in the housing receives gas-liquid stream 32 from inlet 36 and accelerates the gas-liquid stream axially along axis 44 through first nozzle 42. A first inertial impactor collector 96 in the housing is in the path of the accelerated gas-liquid stream and causes liquid particle separation from the gas-liquid stream. A second nozzle 98 in the housing is provided by an orifice at 98 in first inertial impactor collector 96 and receiving flow from first nozzle 42. A second inertial impactor collector 100 in the housing is in the path of flow from second nozzle 98 and causes liquid particle separation. First and second nozzles 42 and 98 are in series such that gas-liquid stream 32 flows through first nozzle 42 and then through second nozzle 98. In the preferred embodiment, first and second nozzles 42 and 98 are coaxial along axis 44, and second inertial impactor collector 100 is axially aligned with and receives flow from each of first and second nozzles 42 and 98. First nozzle 42 has a first width 56 transverse to axis 44. Second nozzle 98 has a second width 102 transverse to axis 44. In the preferred embodiment, second width 102 is less than first width 56, and in one embodiment width 102 is half of width 56. First inertial impactor collector 96 is axially aligned with first nozzle 42. Flow from first nozzle 42 has a first portion 104 impacting first inertial impactor collector 96, and a second portion 106 passing through the orifice at 98 and impacting second inertial impactor collector 100.

FIG. 12 shows a further embodiment and uses like reference numerals from above where appropriate to facilitate understanding. Second inertial impactor collector 100*a* includes a cone 110 having a leading tip 112 axially facing and axially aligned with second nozzle 98*a*. Second inertial impactor collector 100*a* also includes a crater 114 in which cone 110 sits at a base 116 of the cone. Cone 110 extends from tip 112 to base 116 along a first diagonal deflection surface 118 relative to axis 44. Crater 114 extends from base 116 along a second diagonal deflection surface 120 relative to axis 44. Flow through second nozzle 98*a* impacts first diagonal deflection surface 118 and makes a first turn 122 along a first angle less than 90° to flow along a first deflection direction 124, and then impacts second diagonal deflection surface 120 and makes a second turn 126 to flow along a second deflection direction 128. The sum of the noted first and second turns 122 and 126 is greater than 90° in the preferred embodiment. In a further embodiment, first inertial impactor collector 96*a* includes a frustocone having a frustum having a leading tip 132 axially facing and axially aligned with first nozzle 42, wherein the frustum defines the noted orifice at 98*a* of the second nozzle at leading tip 132.

As noted above, the separator has a performance plotted in collection efficiency vs. particle diameter, FIGS. 1, 5, 8, 11, 14, including a 50% collection efficiency over a given range of particle diameter, known as cut-off size. The present system provides a method for expanding the noted given range from a narrow band range to a wider band range and for shifting the range to shift cut-off size to include smaller particle diameters. The method includes identifying a stagnation region at the inertial impactor collector impacted by accelerated flow from the nozzle, and reducing the extent of the stagnation region to change from the narrow band range to the wider band range and to the shifted cut-off size.

FIG. 15 shows a further embodiment and uses like reference numerals from above where appropriate to facilitate understanding. Inertial gas-liquid impactor separator 140 is provided for removing liquid particles from gas-liquid stream 32, and includes housing 34 having inlet 36 for receiving gas-liquid stream 32, and outlet 38 for discharging gas stream 40. Nozzle 42 in the housing receives gas-liquid stream 32 from inlet 36 and accelerates the gas-liquid stream axially along axis 44 through nozzle 42. An inertial impactor collector 142 in the housing is in the path of the accelerated gas-liquid stream and causes liquid particle separation from the gas-liquid stream. Inertial impactor collector 142 has a perforated layer 144 of coalescence media, e.g. fibrous material, having at least one aperture 146 through which the gas-liquid stream flows. Aperture 146 is axially aligned with nozzle 42. Nozzle 42 has a width 56 transverse to axis 44. Aperture 146 has a width 148 transverse to axis 44. In the preferred embodiment, width 148 of aperture 146 is greater than or equal to width 56 of nozzle 42. Inertial impactor collector 142 includes an impactor surface 150 spanning aperture 146. Coalescence media layer 144 has a side surface 152 at aperture 146 facing and defining the aperture. Flow from nozzle 42 has a first portion 154 flowing axially against impactor surface 150, and has a second portion 156 flowing radially against side surface 152. Second portion 156 is an annulus and is concentric to first portion 154. An annular sidewall support 158, e.g. wire mesh or the like, concentrically surrounds aperture 146 and engages and retains side surface 152 of coalescence media layer 144 at aperture 146. Annular sidewall support 158 is pervious to the gas-liquid stream. In further embodiments, impactor surface 150 may include a cone, such as 50, FIGS. 2, 6, 110, FIG. 12, having a leading tip 52, 112 axially facing and axially aligned with nozzle 42 and extending through aperture 146 toward nozzle 42. Coalescence media layer 144 may have a first section such as 64, FIG. 2, adjacent the cone and extending transversely of axis 44, and a second section such as 66 extending along the cone along a diagonal taper relative to axis 44, wherein the second section terminates at the aperture through which the cone extends at its leading tip. The cone may have a cylindrical outer surface in transverse cross-section along a plane 54 normal to axis 44. The cone may have a polygonal outer surface in transverse cross-section along plane 54 normal to axis 44. The cone may be a pyramid. The nozzle and the cone have axially extending centerlines, and in one embodiment such centerlines are coaxial. The nozzle has a width 56 transverse to axis 44, and the cone has a width such as 58 transverse to axis 44, and in the preferred embodiment the width 58 of the cone is greater than or equal to the width 56 of the nozzle.

In the foregoing description, certain terms have been used for brevity, clearness, and understanding. No unnecessary limitations are to be inferred therefrom beyond the requirement of the prior art because such terms are used for descriptive purposes and are intended to be broadly construed. The different configurations, systems, and method steps described herein may be used alone or in combination with other configurations, systems and method steps. It is to be expected that various equivalents, alternatives and modifications are possible within the scope of the appended claims.

What is claimed is:

1. An inertial gas-liquid impactor separator for removing liquid particles from a gas-liquid stream, comprising a housing having an inlet for receiving a gas-liquid stream, and an outlet for discharging a gas stream, an acceleration nozzle in said housing receiving said gas-liquid stream from said inlet and accelerating said gas-liquid stream axially along an axis through said nozzle, an inertial impactor collector in said housing in the path of said accelerated gas-liquid stream and causing liquid particle separation from said gas-liquid stream, wherein said inertial impactor collector comprises an impactor surface extending diagonally relative to said axis.

2. The inertial gas-liquid impactor separator according to claim 1 wherein said impactor surface comprises a cone having a leading tip axially facing and axially aligned with said nozzle.

3. The inertial gas-liquid impactor separator according to claim 2 wherein said cone has a cylindrical outer surface in transverse cross-section along a plane normal to said axis.

4. The inertial gas-liquid impactor separator according to claim 2 wherein said cone has a polygonal outer surface in transverse cross-section along a plane normal to said axis.

5. The inertial gas-liquid impactor separator according to claim 4 wherein said cone is a pyramid.

6. The inertial gas-liquid impactor separator according to claim 2 wherein:

said nozzle has an axially extending centerline;
said cone has an axially extending centerline;
said centerlines are coaxial.

7. The inertial gas-liquid impactor separator according to claim 2 wherein:

said nozzle has a width transverse to said axis;

said cone has a width transverse to said axis;

said width of said cone is greater than or equal to said width of said nozzle.

8. The inertial gas-liquid impactor separator according to claim 2 wherein said inertial impactor collector comprises a layer of coalescence media having an aperture through which said cone extends towards said nozzle.

9. The inertial gas-liquid impactor separator according to claim 8 wherein said layer of coalescence media has a first section adjacent said cone and extending transversely of said axis, and a second section extending along said cone along a diagonal taper relative to said axis, and said second section terminates at said aperture through which said cone extends at said leading tip.

10. The inertial gas-liquid impactor separator according to claim 2 wherein:

said inertial impactor collector comprises a crater in which said cone sits at a base of said cone;

said cone extends from said tip to said base along a first diagonal deflection surface relative to said axis;

said crater extends from said base along a second diagonal deflection surface relative to said axis;

flow through said nozzle impacts said first diagonal deflection surface and makes a first turn along a first angle less than 90° to flow along a first deflection direction, and then impacts said second diagonal deflection surface and makes a second turn to flow along a second deflection direction;

the sum of said first and second turns is greater than 90°.

11. The inertial gas-liquid impactor separator according to claim 10 wherein said inertial impactor collector comprises a layer of coalescence media having an aperture through which said cone extends toward said nozzle.

12. The inertial gas-liquid impactor separator according to claim 11 wherein said layer of coalescence media has a first section adjacent said crater, and a second section extending along said second diagonal deflection surface, and said second section terminates at said aperture through which said cone extends at said leading tip.

13. The inertial gas-liquid impactor separator according to claim 1 wherein said inertial impactor collector comprises a crater from which said impactor surface extends diagonally along a first diagonal deflection surface relative to said axis, said first diagonal deflection surface having a base in said crater, said crater extending from said base along a second diagonal deflection surface relative to said axis, wherein flow through said nozzle impacts said first diagonal deflection surface and makes a first turn along a first angle less than 90° to flow along a first deflection direction and then impacts said second diagonal deflection surface and makes a second turn to flow along a second deflection direction, wherein the sum of said first and second turns is greater than 90°.

14. An inertial gas-liquid impactor separator for removing liquid particles from a gas-liquid stream, comprising a housing having an inlet for receiving a gas-liquid stream, and an outlet for discharging a gas stream, a first nozzle in said housing receiving said gas-liquid stream from said inlet and accelerating said gas-liquid stream axially along an axis through said first nozzle, a first inertial impactor collector in said housing in the path of said accelerated gas-liquid stream and causing liquid particle separation from said gas-liquid stream, a second nozzle in said housing provided by an orifice in said first inertial impactor collector and receiving flow from said first nozzle, a second inertial impactor collector in said housing in the path of flow from said second nozzle and causing liquid particle separation.

15. The inertial gas-liquid impactor separator according to claim 14 wherein said first and second nozzles are in series such that said gas-liquid stream flows through said first nozzle and then through said second nozzle.

16. The inertial gas-liquid impactor separator according to claim 15 wherein:

said first and second nozzles are coaxial along said axis;

said second inertial impactor collector is axially aligned with and receives flow from each of said first and second nozzles.

17. The inertial gas-liquid impactor separator according to claim 16 wherein:

said first nozzle has a first width transverse to said axis;

said second nozzle has a second width transverse to said axis;

said second width is less than said first width.

18. The inertial gas-liquid impactor separator according to claim 14 wherein said first inertial impactor collector is axially aligned with said first nozzle, and wherein the flow from said first nozzle has a first portion impacting said first inertial impactor collector, and a second portion passing through said orifice and impacting said second inertial impactor collector.

19. The inertial gas-liquid impactor separator according to claim 14 wherein said second inertial impactor collector comprises a cone having a leading tip axially facing and axially aligned with said second nozzle, said second inertial impactor collector also comprises a crater in which said cone sits at a base of said cone, said cone extending from said tip to said base along a first diagonal deflection surface relative to said axis, said crater extending from said base along a second diagonal deflection surface relative to said axis, wherein flow through said second nozzle impacts said first diagonal deflection surface and makes a first turn along a first angle less than 90° to flow along a first deflection direction and then impacts said second diagonal deflection surface and makes a second turn to flow along a second deflection direction, wherein the sum of said first and second turns is greater than 90°.

20. The inertial gas-liquid impactor separator according to claim 14 wherein said first inertial impactor collector comprises a frustocone having a frustum having a leading tip axially facing and axially aligned with said first nozzle, said frustum defining said orifice of said second nozzle at said leading tip.

21. In an inertial gas-liquid impactor separator for removing liquid particles from a gas-liquid stream and having a housing having an inlet for receiving a gas-liquid stream, and an outlet for discharging a gas stream, an acceleration nozzle in said housing receiving said gas-liquid stream from said inlet and accelerating said gas-liquid stream axially along an axis through said nozzle, an inertial impactor collector in said housing in the path of said accelerated gas-liquid stream and causing liquid particle separation from said gas-liquid stream, said separator having a performance plotted in collection efficiency vs. particle diameter, including a 50% collection efficiency over a given range of particle diameter, known as cut-off size, a method for expanding said given range from a narrow band range to a wider band range and for shifting the range to shift cut-off size to include smaller particle diameters, comprising identifying a stagnation region at said inertial impactor collector impacted by accelerated flow from said nozzle, and reducing the extent of said stagnation region to change from said narrow band range to said wider band range and to said shifted cut-off size.

22. An inertial gas-liquid impactor separator for removing liquid particles from a gas-liquid stream, comprising a housing having an inlet for receiving a gas-liquid stream, and an outlet for discharging a gas stream, an acceleration nozzle in said housing receiving said gas-liquid stream from said inlet and accelerating said gas-liquid stream axially along an axis through said nozzle, an inertial impactor collector in said housing in the path of said accelerated gas-liquid stream and causing liquid particle separation from said gas-liquid stream, said inertial impactor collector having a perforated layer of coalescence media having at least one aperture through which said gas-liquid stream flows.

23. The inertial gas-liquid impactor separator according to claim 22 wherein said aperture is axially aligned with said nozzle.

24. The inertial gas-liquid impactor separator according to claim 23 wherein:

said nozzle has a width transverse to said axis;

said aperture has a width transverse to said axis;

said width of said aperture is greater than or equal to said width of said nozzle.

25. The inertial gas-liquid impactor separator according to claim 23 wherein:

said inertial impactor collector comprises an impactor surface spanning said aperture;

said layer of coalescence media has a side surface at said aperture facing and defining said aperture;

flow from said nozzle has a first portion flowing axially against said impactor surface, and has a second portion flowing radially against said side surface.

26. The inertial gas-liquid impactor separator according to claim 25 wherein said second portion is an annulus and is concentric to said first portion.

27. The inertial gas-liquid impactor separator according to claim 26 comprising an annular sidewall support concentrically surrounding said aperture and engaging and retaining said side surface of said layer of coalescence media at said aperture.

28. The inertial gas-liquid impactor separator according to claim 27 wherein said annular sidewall support is pervious to said gas-liquid stream.

29. The inertial gas-liquid impactor separator according to claim 25 wherein said impactor surface comprises a cone having a leading tip axially facing and axially aligned with said nozzle and extending through said aperture toward said nozzle.

30. The inertial gas-liquid impactor separator according to claim 29 wherein said layer of coalescence media has a first section adjacent said cone and extending transversely of said axis, and a second section extending along said cone along a diagonal taper relative to said axis, and said second section terminates at said aperture through which said cone extends at said leading tip.

31. The inertial gas-liquid impactor separator according to claim 29 wherein said cone has a cylindrical outer surface in transverse cross-section along a plane normal to said axis.

32. The inertial gas-liquid impactor separator according to claim 29 wherein said cone has a polygonal outer surface in transverse cross-section along a plane normal to said axis.

33. The inertial gas-liquid impactor separator according to claim 32 wherein said cone is a pyramid.

34. The inertial gas-liquid impactor separator according to claim 29 wherein:

said nozzle has an axially extending centerline;

said cone has an axially extending centerline;

said centerlines are coaxial.

35. The inertial gas-liquid impactor separator according to claim 29 wherein:

said nozzle has a width transverse to said axis;

said cone has a width transverse to said axis;

said width of said cone is greater than or equal to said width of said nozzle.

36. The inertial gas-liquid impactor separator according to claim 1 wherein said nozzle has first and second axially sequential sections, said first section being an axially upstream section, said second section being an axially downstream section, said first section having a first diameter, said second section having a second diameter, said second diameter being different than said first diameter.

37. The inertial gas-liquid impactor separator according to claim 36 wherein said first section of said nozzle is frustoconically tapered along a diagonal taper relative to said axis from a larger upstream diameter to a smaller downstream diameter meeting said second section of said nozzle.

38. The inertial gas-liquid impactor separator according to claim 37 wherein said second section of said nozzle has a constant diameter.

39. The inertial gas-liquid impactor separator according to claim 38 wherein said constant diameter of said second section of said nozzle is equal to said downstream diameter of said frustoconically tapered first section of said nozzle.

40. The inertial gas-liquid impactor separation according to claim 1 wherein said impactor surface is diagonally tapered along a first diagonal taper relative to said axis, said nozzle is diagonally tapered along a second diagonal taper relative to said axis, said gas-liquid stream flows from upstream to downstream through said nozzle and then against said impactor surface, wherein said first and second diagonal tapers are tapered along opposite slopes such that said first diagonal taper tapers diagonally toward said axis as it extends from upstream to downstream, and such that said second diagonal taper tapers diagonally away from said axis as it extends from upstream to downstream.

41. The method according to claim 21 wherein said nozzle has first and second axially sequential sections, said first section being an axially upstream section, said second section being an axially downstream section, said first section having a first diameter, said second section having a second diameter, said second diameter being different than said first diameter.

42. The method according to claim 41 wherein said first section of said nozzle is frustoconically tapered along a diagonal taper relative to said axis from a larger upstream diameter to a smaller downstream diameter meeting said second section of said nozzle.

43. The method according to claim 42 wherein said second section of said nozzle has a constant diameter.

44. The method according to claim 43 wherein said constant diameter of said second section of said nozzle is equal to said downstream diameter of said frustoconically tapered first section of said nozzle.

45. The method according to claim 21 wherein said impactor surface is diagonally tapered along a first diagonal taper relative to said axis, said nozzle is diagonally tapered along a second diagonal taper relative to said axis, said gas-liquid stream flows from upstream to downstream through said nozzle and then against said impactor surface, wherein said first and second diagonal tapers are tapered along opposite slopes such that said first diagonal taper tapers diagonally toward said axis as it extends from upstream to downstream, and such that said second diagonal taper tapers diagonally away from said axis as it extends from upstream to downstream.

46. The inertial gas-liquid impactor separator according to claim 22 wherein said nozzle has first and second axially sequential sections, said first section being an axially upstream section, said second section being an axially downstream section, said first section having a first diameter, said second section having a second diameter, said second diameter being different than said first diameter.

47. The inertial gas-liquid impactor separator according to claim 46 wherein said first section of said nozzle is frustoconically tapered along a diagonal taper relative to said axis from a larger upstream diameter to a smaller downstream diameter meeting said second section of said nozzle.

48. The inertial gas-liquid impactor separator according to claim 47 wherein said second section of said nozzle has a constant diameter.

49. The inertial gas-liquid impactor separator according to claim 48 wherein said constant diameter of said second section of said nozzle is equal to said downstream diameter of said frustoconically tapered first section of said nozzle.

50. The inertial gas-liquid impactor separator according to claim 22 wherein said impactor surface is diagonally tapered along a first diagonal taper relative to said axis, said nozzle is diagonally tapered along a second diagonal taper relative to said axis, said gas-liquid stream flows from upstream to downstream through said nozzle and then against said impactor surface, wherein said first and second diagonal tapers are tapered along opposite slopes such that said first diagonal taper tapers diagonally toward said axis as it extends from upstream to downstream, and such that said second diagonal taper tapers diagonally away from said axis as it extends from upstream to downstream.

* * * * *